United States Patent
Sugita

(10) Patent No.: US 7,826,670 B2
(45) Date of Patent: Nov. 2, 2010

(54) DATA COMPRESSION APPARATUS AND DATA COMPRESSION PROGRAM STORAGE MEDIUM

(75) Inventor: Yukio Sugita, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 941 days.

(21) Appl. No.: 11/453,172

(22) Filed: Jun. 15, 2006

(65) Prior Publication Data
US 2006/0285756 A1    Dec. 21, 2006

(30) Foreign Application Priority Data

Jun. 15, 2005  (JP)  ............................ 2005-174772
Jun. 16, 2005  (JP)  ............................ 2005-176404
Jun. 16, 2005  (JP)  ............................ 2005-176447

(51) Int. Cl.
*G06K 9/36* (2006.01)
(52) U.S. Cl. ........................................ 382/232; 382/56
(58) Field of Classification Search .................. 382/232
See application file for complete search history.

(56) References Cited

U.S. PATENT DOCUMENTS

| 4,776,029 | A | * | 10/1988 | Shimura | ...................... 382/238 |
| 4,903,317 | A | * | 2/1990 | Nishihara et al. | ........... 382/244 |
| 5,710,719 | A | * | 1/1998 | Houle | ........................ 382/232 |
| 2002/0048405 | A1 | * | 4/2002 | Zandi et al. | .................. 382/232 |
| 2002/0110280 | A1 | * | 8/2002 | Prakash et al. | .............. 382/240 |

FOREIGN PATENT DOCUMENTS

| JP | 62-247677 | | 10/1987 |
| JP | 5-328142 | A | 12/1993 |
| JP | 08-265752 | | 10/1996 |
| JP | 9-200540 | A | 7/1997 |
| JP | 10-164620 | A | 6/1998 |
| JP | 2001-520822 | A | 10/2001 |
| WO | WO 98/47234 | A1 | 10/1998 |

OTHER PUBLICATIONS

Pitas, Ioannis, Digital Image Processing Algorithms, Prentice Hall, 1993, pp. 176-184.*

* cited by examiner

*Primary Examiner*—Samir A. Ahmed
*Assistant Examiner*—Ruiping Li
(74) *Attorney, Agent, or Firm*—Sughrue Mion, PLLC

(57) ABSTRACT

There are provided a data compression apparatus and a data compression program capable of performing new and preferable compression processing applicable to compression of CT data. They are provided with: a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values; a lossless compression section which performs lossless compression processing for the first data to be compressed which has been created by the thinning processing section; and a lossy compression section which performs lossy compression processing for the second data to be compressed which has been created by the thinning processing section.

17 Claims, 24 Drawing Sheets

(A)

(B)

(A)

(B)

06 02 02 02 01 01 01 01 04 05 00 ———————— 00
                                    └─────────┘
                                    32,767 CONTINUATIONS
⇩
06 02 02 02 01 04 04 05 00 FF 7F

Fig. 11

| BEFORE ENCODING | AFTER ENCODING |
|---|---|
| A1 | 00 |
| A2 | 01 |
| A3 | 100 |
| A4 | 101 |
| A5 | 11000 |
| A6 | 11001 |
| A7 | 11101 |
| A8 | 11011 |
| A9 | 111000 |
| A10 | 111001 |
| A11 | 111010 |
| A12 | 111011 |
| A13 | 111100 |
| A14 | 111101 |
| A15 | 111110 |
| A16 | 111111 |

Fig. 15

| AFTER ENCODING | BEFORE ENCODING |
|---|---|
| 1000 | 0-31 |
| 1001 | 32-63 |
| 1010 | 64-95 |
| 1011 | 96-127 |
| 1100 | 128-159 |
| 1101 | 160-191 |
| 1110 | 192-223 |
| 1111 | 224-255 |

DATA COMPRESSION APPARATUS AND DATA COMPRESSION PROGRAM STORAGE MEDIUM

BACKGROUND OF THE INVENTION

1. Field of the Invention

The present invention relates to a data compression apparatus which compresses data such as image data and a data compression program storage medium in which a data compression program for causing an information processing apparatus such as a computer to operate as the data compression apparatus is stored.

2. Description of the Related Art

There has been broadly adopted a technique for compressing data such as image data to reduce storage capacity or communication traffic.

For example, in Japanese Patent Laid-Open No. 05-328142, the following technique is disclosed. When representative colors are selected from an original image to configure a CLUT (color lookup table), color numbers are assigned so that a sequence of color numbers may indicate color data of close values. Then, a bitmap in accordance with the CLUT is created, and difference between color numbers of adjacent pixels is obtained. When the value of the difference is large, the color numbers of the bit map are changed within such a range that image quality deterioration is not caused to reduce the difference to be a smaller value, and run-length encoding is performed for the difference data.

In Japanese Patent Laid-Open No. 10-164620, the following technique is proposed. Data for image which is configured by multiple data, each of which is assigned to each color, is lossily compressed and encoded. Then, one of the data is assigned to transparent color, and the transparent color is to be losslessly compressed. Each data is configured by an immediate value (the first value in difference encoding) and multiple difference values (previous values in the difference encoding) following the immediate value. When these values are lossily compressed and encoded, the immediate value and difference values indicating the transparent color is losslessly compressed. Furthermore, the immediate value indicating the transparent color may be an intermediate value among the data values of the respective colors, or the difference values indicating the transparent color may be set to "0".

In Japanese Patent Laid-Open No. 2001-5-20822, it is proposed to encode a number based on difference between a predicted number (s'(j)) and an actual number (s(j)).

In Japanese Patent Laid-Open No. 09-200540, an image compression apparatus is proposed which recognizes, for a pixel data sequence on the n-th column, the distribution condition of the same pixel data in the vertical scanning direction as well as the distribution condition of the same pixel data in the horizontal scanning direction, and determines whether to perform compression processing for the same pixel data continuing in the vertical scanning direction or to perform compression processing for the same pixel data continuing in the horizontal scanning direction, based on the recognition result.

Here, a system to which a data compression technique is applied will be introduced.

FIG. 1 shows an example of a print system to which a data compression technique is applied, and FIG. 2 is a diagram showing the flow of data processing in the print system.

As shown in FIG. 1, this print system is constituted by a host controller 100, an interface device 200 and a printer 300. The host controller 100 and the interface device 200 are connected via an interface cable 150, such as a SCSI cable, and the interface device 200 and the printer 300 are connected via an interface cable 250.

As shown in FIG. 2, inside the host controller 100, data 11 of characters and images written in various languages or formats, such as PDF, PS and TIFF, are classified as image (CT: continuous tone) data and character or line (LW: line work) data. Then, by performing RIP (raster image processing) for each of them, bitmap data 12A and 13A are generated. Furthermore, data compression processing is performed for each of them to generate lossily compressed data 14 for CT and losslessly compressed data 15 for LW. These compressed data 14 and 15 are transferred from the host controller 100 to the interface device 200 via the general-purpose interface cable 150 shown in FIG. 1. In the interface device 200, data expansion processing is performed for the transferred, compressed data 14 and 15 to generate bitmap data 12B and 13B corresponding to the bitmap data 12A and 13A for which the data compression processing at the host controller 100 has not been performed yet. In this case, since lossy compression processing has been performed for the CT data in the data compression at the host controller 100, the CT data after the data expansion (the bitmap data 12B) is not completely recovered to the CT data before the data compression (the bitmap data 12A). However, almost the same bitmap data is recovered. As for the LW data, since lossless compression processing has been performed in the data compression at the host controller 100, the LW data after the data expansion (the bitmap data 13B) is recovered to the same data as the LW data before the data compression (the bitmap data 13A).

In the interface device 200, the CT data (the bitmap data 12B) and the LW data (the bitmap data 13B) after the data expansion are synthesized, and sent to the printer 300 with halftone dot information and the like added thereto. In the printer 300, an image is print-outputted in accordance with the bitmap data and the tag information added thereto which have been received from the interface device 200.

For example, when the host controller 100 and the interface device 200 are located away from each other, or when it is necessary to configure the host controller 100 and the interface device 200 as separate apparatuses, such as in the case of a system in which the interface device 200 receives image data from multiple host controllers, it is possible to shorten the time required for data transfer from the host controller 100 to the interface device 200 and enhance print productivity by making such a configuration in which data compression is performed by the host controller 100, the data is transferred to the interface device 200, and data expansion is performed at the interface equipment, as shown in FIG. 2.

In this case, in general, a compression method which is lossy compression but the compression ratio of which is high, such as JPEG, is adopted for the CT data, and a lossless compression method such as Pack Bits is adopted for the LW data.

However, the compression method such as JPEG requires time for compression processing by software, and this causes deterioration of the throughput of the entire compression processing system.

In consideration of the above situation, the present invention provides a data compression apparatus and a data compression program storage medium capable of performing new, preferable compression processing which is applicable to compression of CT data.

SUMMARY OF THE INVENTION

The present invention has been made in view of the above circumstances and provides a data compression apparatus which performs data compression processing for data to be compressed, the data being constituted by a sequence of numeric values indicated by a predetermined unit number of bits; the data compression apparatus being provided with:

a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values;

a lossless compression section which performs lossless compression processing for the first data to be compressed which has been created by the thinning processing section; and a lossy compression section which performs lossy compression processing for the second data to be compressed which has been created by the thinning processing section.

The data compression apparatus of the present invention is preferable in that:

the lossy compression section determines, for each of the numeric values constituting the second data to be compressed which has been created by the thinning processing section, whether or not the numeric value is a value between the numeric values before and after the numeric value, which have been thinned out by the thinning of the thinning processing section, outputs a code indicating that the numeric value is an intermediate value if the numeric value is an intermediate value, and outputs a numeric value obtained by re-expressing the numeric value by a smaller number of bits than the unit number of bits if the numeric value is not an intermediate value.

In this case, a zero-bit code (that is, a state in which substantially nothing is outputted) is also included in the codes described above. Decoding in the case where the zero-bit code is used is performed, for example, in the following procedure. That is, it is confirmed whether or not the portion is an edge portion based on decoded true pixels; fake pixels are decoded from the numeric values with a smaller number of bits if it is an edge portion; and fake pixels are generated by interpolation processing with the use of the true pixels if the portion is not an edge portion.

This preferable data compression apparatus may be such that, when re-expressing a numeric value by the smaller number of bits, the lossy compression section rounds down low-order digits of the value with the unit number of bits, or may be such that, when re-expressing a numeric value by the smaller number of bits, the lossy compression section re-expresses the numeric value by dividing the range of numeric values which is left after excluding the range of the numeric values thinned out from respective predetermined locations from the range of numeric values to be expressed by the unit number of bits, and allocating each of the divided ranges to a code indicated by the smaller number of bits.

The data compression apparatus of the present invention is also preferable in that:

the data to be compressed indicates a two-dimensional image;

the data compression apparatus is provided with a determination section which determines an edge portion in the image; and for each of the numeric values constituting the second data to be compressed which has been created by the thinning processing section, the lossy compression section outputs a predetermined code with a smaller number of bits than the unit number of bits if the numeric value is not an edge portion determined by the determination section, and outputs a numeric value obtained by re-expressing the numeric value by a smaller number of bits than the unit number of bits if the numeric value is an edge portion.

In this preferable data compression apparatus, it is preferable that the determination section determines an edge portion in the image, based on difference between adjacent numeric values in the sequence of numeric values constituting the first data to be compressed which has been created by the thinning processing section.

It is more preferable that the determination section determines an edge portion in the image, for each of the numeric values constituting the first data to be compressed, based on two-dimensional differences based on multiple numeric values which are adjacent to the numeric value in multiple directions when seen on the image.

Furthermore, the data compression apparatus of the present invention is preferable in that:

the high-order data compression section is provided with a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed.

Furthermore, the data compression apparatus of the present invention is preferable in that:

the lossless compression section is provided with:

a difference generation section which generates, by determining difference between adjacent numeric values in the sequence of numeric values constituting the first data to be compressed which has been created by the thinning processing section, new data to be compressed which is configured by a sequence of numeric values indicating the differences;

an offset section which offsets each of the numeric values constituting the new data to be compressed which has been generated by the difference generation section, by a predetermined value;

a division section which, by separating each of the numeric values of the data to be compressed which have been offset by the offset section into a high-order bit portion and a low-order bit portion with a predetermined dividing number of bits smaller than the unit number of bits, divides the data to be compressed into high-order data configured by a sequence of the high-order bit portions of the respective numeric values and low-order data configured by a sequence of the low-order bit portions of the respective numeric values;

a high-order data compression section which performs lossless compression processing for the high-order data divided by the division section; and a low-order data compression section which performs lossless compression processing for the low-order data divided by the division section.

Here, the term "adjacent" in the phrase "by determining difference between adjacent numeric values in the sequence of numeric values constituting the first data to be compressed" may mean that numeric values are adjacent to each other on a data stream, but the term is not necessarily limited to the meaning. For example, in the case where two-dimensional image data is treated as a one-dimensional stream data, numeric values may be adjacent to each other when they are seen on a two-dimensional image. The same goes for the description below.

This preferable data compression apparatus provided with the difference generation section and the like is preferable in that:

the high-order data compression section is provided with a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed.

The preferable data compression apparatus provided with the difference generation section and the like is more preferable in that:

the high-order data compression section is provided with:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed; and a second encoding section which performs entropy encoding for the data encoded by the first encoding section, with the use of a table in which a code and a numeric value are associated with each other.

Here, in the data compression apparatus of the present invention, the high-order data compression section may be provided with:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed; and a second encoding section which performs Huffman encoding for the data encoded by the first encoding section, with the use of a Huffman table.

The preferable compression apparatus provided with the difference generation section is more preferable in that:

the high-order data compression section is provided with:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed;

a histogram calculation section which determines a histogram of numeric values appearing in the data encoded by the first data compression section;

a code assignment section which assigns a shorter code to a numeric value with a higher appearance frequency in a table in which a code and a numeric value are associated with each other, based on the histogram determined by the histogram calculation section; and a second encoding section which performs entropy encoding for the data encoded by the first encoding section, with the use of a table in which codes are assigned by the code assignment section.

The preferable data compression apparatus provided with the difference generation section and the like is preferable in that:

the low-order data compression section performs entropy encoding for the low-order data with the use of a table in which a code and a numeric value is associated.

Here, in the data compression apparatus of the present invention, the low-order data compression section may perform Huffman encoding for the low-order data with the use of a Huffman table.

Furthermore, the preferable data compression apparatus provided with the difference generation section and the like is also preferable in that the low-order data compression section outputs the low-order data without compressing the low-order data in response to an instruction to omit compression.

Furthermore, a data compression apparatus of the present invention is a data compression apparatus which performs data compression processing for data to be compressed, the data being constituted by a sequence of numeric values indicated by a predetermined unit number of bits; the data compression apparatus being provided with:

a first lossless compression processing section which performs first lossless compression processing for the data to be compressed;

a second lossless compression processing section which performs second lossless compression processing for the data to be compressed if the result of the data compression by the first lossless compression processing section does not reach a predetermined target compression ratio; and a lossy compression processing section which performs lossy compression processing for the data to be compressed if the result of the data compression by the second lossless compression processing section does not reach the target compression ratio; wherein one of the first lossless compression processing section and the second lossless compression processing section is provided with:

a difference generation section which generates, by determining difference between adjacent numeric values in the sequence of numeric values constituting the data to be compressed, new data to be compressed which is configured by a sequence of numeric values indicating the differences;

an offset section which offsets each of the numeric values constituting the new data to be compressed which has been generated by the difference generation section, by a predetermined value;

a division section which, by separating each of the numeric values of the data to be compressed which have been offset by the offset section into a high-order bit portion and a low-order bit portion with a predetermined dividing number of bits smaller than the unit number of bits, divides the data to be compressed into high-order data configured by a sequence of the high-order bit portions of the respective numeric values and low-order data configured by a sequence of the low-order bit portions of the respective numeric values;

a high-order data compression section which performs lossless compression processing for the high-order data divided by the division section; and a low-order data compression section which performs lossless compression processing for the low-order data divided by the division section;

the other of the first lossless compression processing section and the second lossless compression processing section performs lossless compression processing including encoding processing for outputting the numeric values other than one or multiple predetermined numeric values to be compressed in the original data to be compressed as they are, and outputs each of the numeric values to be compressed after encoding the numeric value to be compressed into the numeric value to be compressed and a numeric value indicating the number of continuations of the same numeric value to be compressed; and the lossy compression section is provided with:

a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values;

a lossless compression section which performs lossless compression processing for the first data to be compressed which has been created by the thinning processing section; and a lossy compression section which performs lossy compression processing for the second data to be compressed which has been created by the thinning processing section.

A data compression program storage medium of the present invention is a data compression program storage medium which stores a data compression program which is incorporated in an information processing apparatus for executing a program and causes the information processing apparatus to perform data compression processing for data to be compressed, the data being constituted by a sequence of numeric values indicated by a predetermined unit number of bits, the data compression program constructing, on the information processing apparatus:

a thinning processing section which creates, by cyclically thinning out a numeric value from the-sequence of numeric values constituting the data to be compressed, first data to be compressed which is constituted by a sequence of the numeric values taken out from the data to be compressed by the thinning out, and second data to be compressed which is constituted by a sequence of the remaining numeric values;

a lossless compression section which performs lossless compression processing for the first data to be compressed which has been created by the thinning processing section; and a lossy compression section which performs lossy compression processing for the second data to be compressed which has been created by the thinning processing section.

As for the data compression program storage medium according to the present invention, only a basic aspect thereof is shown here. This is simply intended to avoid redundancy, and the data compression program storage medium according to the present invention includes not only the above-described basic aspect but also various aspects corresponding to the respective aspects of the data compression apparatuses described above.

As for the elements, such as the difference generation section, configured on a computer by the data compression program of the present invention, one element may be constructed by one program module; one element may be constructed by multiple program elements; or multiple elements may be constructed by one program module. Each of the elements may be constructed as such that executes the operation itself. Alternatively, it may be constructed as such that gives an instruction to another program or a program module incorporated in a computer to execute the operation.

According to the data compression apparatus and the data compression program storage medium of the present invention described above, data to be compressed is separated into first data to be compressed, which has been cyclically thinned out, and remaining second data, and lossless compression processing is performed for the first data to be compressed and lossy compression processing is performed for the second data to be compressed. As for the second data to be compressed, a part of original information is lost by lossy compression. However, since correlation between adjacent pixels of a CT image is strong, the image quality of the original image can be kept high even if the second data to be compressed is significantly compressed.

If the lossy compression section is such that, when compressing the second data to be compressed, switches a compression method according to whether or not the value is between the first data to be compressed, then the image quality can be kept by avoiding compression for such a portion as is not correlated with an adjacent pixel as well as realizing significant compression for such a portion as is correlated with an adjacent pixel.

If the lossy compression section is such that, when compressing the second data to be compressed, switches a compression method according to whether or not the data corresponds to an edge in the image, then image quality can be kept by avoiding compression for an edge portion as well as realizing significant compression for a non-edge portion.

If the determination section is such that determines an edge portion based on difference, then edge determination can be performed more easily. Furthermore, if the difference is two-dimensional difference, determination of an edge portion is more accurate.

If the lossless compression section is provided with a difference generation section and the like, then, at this lossless compression section, new data to be compressed which has been generated from original data to be compressed and the numeric values of which have been offset by an offset section is divided into high-order data and low-order data, and lossless compression processing is performed for them by a high-order data compression section and a low-order data compression section, respectively. Generally, in the case of new data to be compressed to be obtained from CT data, the distribution tendency of numeric values in data is remarkably different in the high-order data and in the low-order data as described later, and therefore, there exist lossless compression processings suitable for the respective data, and a high compression ratio is achieved as a whole by the compression processing according to the present invention. As the lossless compression processing provided for each data, processing by a simple algorithm is applicable. Therefore, the processing time required for the compression processing according to the present invention is short. Thus, according to the lossless compression section provided with the difference generation section and the like, especially preferable lossless compression processing is realized when applied to compression of CT data.

If the high-order data compression section is provided with a first encoding section, only each numeric value to be compressed are encoded into the numeric value and a value indicating the continuations. Therefore, the situation is avoided that the redundancy degree increases in comparison to original data, and the compression ratio is improved.

If the high-order data compression section is provided with a second encoding section, further improvement of the compression ratio by entropy encoding (typically, Huffman encoding) is expected.

Furthermore, if the high-order data compression section is provided with a histogram calculation section and a code assignment section, and the second encoding section performs entropy encoding (for example, Huffman encoding) with the use of a table in which codes are assigned by the code assignment section, then the compression ratio can be more significantly improved in comparison with entropy encoding with the use of a table in which assignment of codes is fixed.

If the low-order data compression section is such that performs entropy encoding, then further improvement of the compression ratio by the entropy encoding (typically, Huffman encoding) is expected.

Furthermore, if the low-order data compression section is such that outputs low-order data without compressing it in response to an instruction to omit compression, then it is possible to select higher-speed compression processing by such an instruction.

If data to be compressed is compressed by each of the first lossless compression processing section, the second lossless compression processing section and a lossy compression processing section described above in order to obtain a target compression ratio, the processing time is shorter than that required by a conventional JPEG method or the like even if compression is performed again by another compression processing when a target compression ratio is not reached by a certain compression processing, because any of the compression processings at these first lossless compression processing section, second lossless compression processing section and lossy compression processing section is a high-speed processing by a simple procedure. At one of the first lossless compression processing section and the second lossless compression processing section, lossless compression processing suitable for compression of CT data is executed, and at the other, lossless compression processing suitable for compression of LW data is executed. Therefore, it is expected that a lot of image data is significantly compressed by either one of the first and the second lossless compression processing section, and a target compression ratio is reached while the original image data quality is completely kept. Lossy compression is executed only when such a special type of image data that a target compression ratio is not reached by either of the lossless compression processings or when the compression target is especially high.

BRIEF DESCRIPTION OF THE DRAWINGS

FIG. 11 illustrates encoding at a run-length encoding section shown in FIG. 3;

FIG. 15 shows an example of a Huffman table;

DETAILED DESCRIPTION OF THE INVENTION

Figure 1:
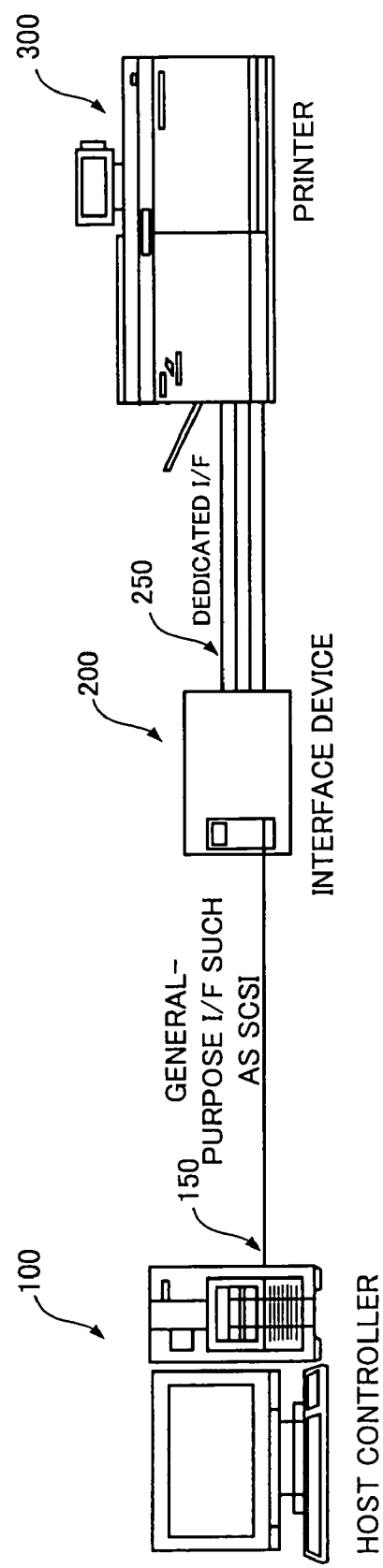
FIG. 1 shows an example of a print system to which a data compression technique is applied.
Figure 2:
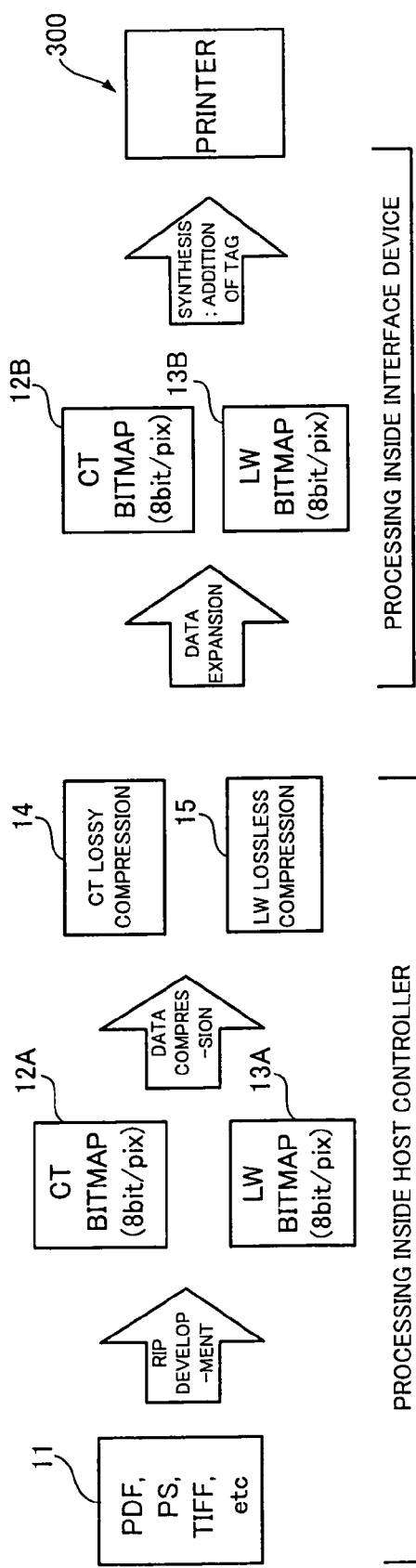
FIG. 2 is a diagram showing the flow of data processing in the print system.

First and second embodiments described below relate to an image compression apparatus to be incorporated in a host controller in the entire system shown in FIG. 1, and more specifically to processing for performing data compression for the CT bitmap data 12A in the host controller shown in FIG. 2. Accordingly, it is to be understood that the data compression processing for CT data described with reference to FIGS. 1 and 2 is replaced with data compression processings as the embodiments of the present invention described below, and that the data expansion (decompression) processing in (the) interface device is also replaced with data expansion (decompression) processings corresponding to the data compression processings as the embodiments of the present invention. Redundant illustration and description similar to those about the entire system shown in FIG. 1 and the flow of the processing shown in FIG. 2 will be omitted.

Figure 3:
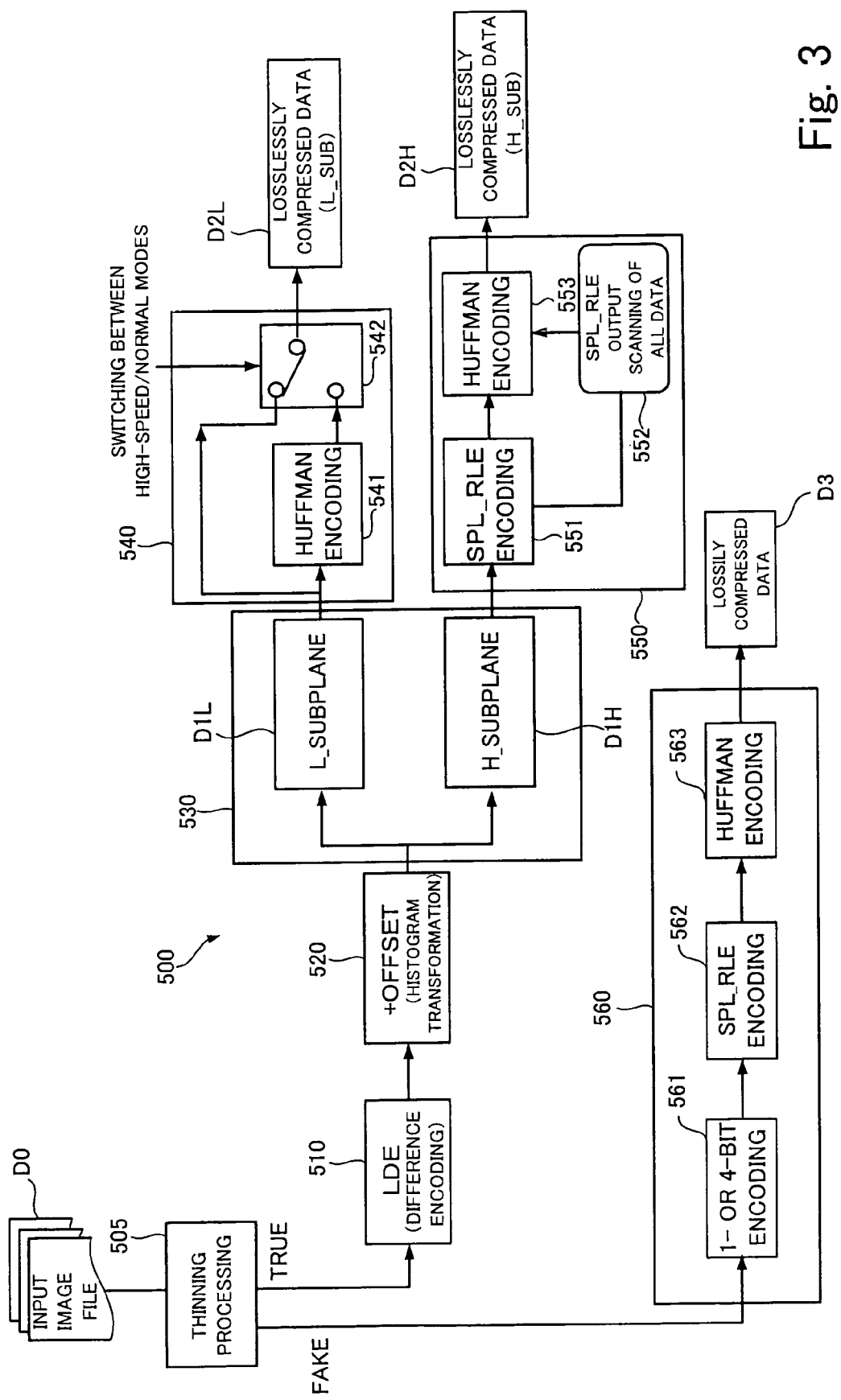
FIG. 3 is a block diagram showing an-image compression apparatus corresponding to a first embodiment of the data compression apparatus of the present invention.

FIG. 3 is a block diagram showing an image compression apparatus corresponding to the first embodiment of the data compression apparatus of the present invention.

The image compression apparatus 500 shown in FIG. 3 is provided with a thinning processing section 505, a difference encoding section 510, an offset section 520, a plane division section 530, an L plane compression section 540, an H plane compression section 550 and a fake pixel compression section 560. The details of each of the sections 505 to 560 will be described later. The flow of image data in this image compression apparatus 500 is as shown below.

An input image file D0 (in this embodiment, a file in which the CT data 12A developed in a bitmap is stored, as shown in FIG. 2) is inputted to the thinning processing section 505 of the image compression apparatus 500 shown in FIG. 3, and true pixel data corresponding to cyclic pixel portions in the image is thinned from the image data. The data left after the thinning is to be fake pixel data. The true pixel data and the fake pixel data correspond to an example of the first data to be compressed and an example of the second data to be compressed according to the present invention, respectively.

The true pixel data is inputted to the difference encoding section 510, and difference encoding processing, that is, processing for determining difference between adjacent numeric values of a sequence of numeric values constituting the inputted data to generate image data configured by a sequence of eight-bit numeric values indicating the differences is performed. This difference encoding section 510 is an example of the difference generation section according to the present invention.

The image data configured by a sequence of numeric values indicating differences, which has been generated at the difference encoding section 510, is inputted to the offset section 520 and is offset by a predetermined value. After that, each eight-bit numeric value in the image data is separated into low-order four bits and high-order four bits at the plane division section 530, and thereby the image data is divided into a low subplane D1L configured by a sequence of low-order four-bit numeric values and a high subplane D1H configured by a sequence of high-order four-bit numeric values. The offset section 520 corresponds to an example of the offset section according to the present invention, and the plane division section 530 corresponds to an example of the division section according to the present invention. The low subplane D1L and the high subplane D1H correspond to an example of the low-order data and an example of the high-order data according to the present invention, respectively.

The low subplane D1L and the high subplane D1H divided at the plane division section 530 are inputted to the L plane compression section 540 and the H plane compression section 550, respectively, and lossless compression is performed therefore. The L plane compression section 540 and the H plane compression section 550 correspond to an example of the low-order data compression section and an example of the high-order data compression section according to the present invention, respectively.

In a Huffman encoding section 541 of the L plane compression section 540, encoding processing is performed in which, in accordance with a fixed Huffman table for associating numeric values and codes, the numeric values constituting the low subplane D1L inputted to the Huffman encoding section 541 are replaced with codes according to the Huffman table. This Huffman encoding is a kind of entropy encoding. A mode switching section 542 is incorporated in the L plane compression section 540. This mode switching section 542 performs switching between a normal mode in which the above-described Huffman encoding by the Huffman encoding section 541 is performed and a high-speed mode in which the Huffman encoding is omitted and the low subplane D1L is immediately outputted, in response to a user's instruction to perform switching between the high-speed mode and the normal mode. From the L plane compression section 540, compressed low-order data D2L, which is the compressed low subplane D1L, is outputted. In the case of the high-speed mode, however, the compressed low-order data D2L is the low subplane D1L itself.

The H plane compression section 550 is provided with a run-length encoding section 551, a data scanning section 552 and a Huffman encoding section 553, and the high subplane D1H is inputted to the run-length encoding section 551.

At the run-length encoding section 551, existence of one or more numeric values to be compressed and the number of continuations of the same numeric value to be compressed are detected from the inputted data of the high subplane D1H first. Then, in the run-length encoding section 551, based on the detection result, the numeric values other than the numeric values to be compressed in the data of the high subplane D1H are outputted as they are, and, as for each of the numeric values to be compressed, encoding processing is performed in which the numeric value to be compressed is encoded into the numeric value to be compressed itself and a value indicating the number of continuations of the same numeric value to be compressed as the numeric value to be compressed. When the encoding processing is performed by the run-length encoding section 551, encoding is performed in which the number of continuations of the same numeric value to be compressed is expressed by a different number of bits according to the number of continuations. Specifically, when the number of continuations of the same numeric value to be compressed is equal to or below a predetermined number, the number of continuations is expressed by a unit number of bits, and when the number of continuations exceeds the predetermined number, it is expressed by twice the unit number of bits. In this embodiment, this run-length encoding section 551 corresponds to an example of the first encoding section according to the present invention.

The data encoded at the run-length encoding section 551 is then inputted to both of the data scanning section 552 and the Huffman encoding section 553. At the data scanning section 552, all the data encoded at the run-length encoding section 551 is scanned to determine the appearance frequencies (histogram) of all the numeric values which appear in the data. In this embodiment, the processing for determining the appearance frequencies is executed for each high subplane D1H shown in FIG. 3, and there are determined the appearance frequencies of the numeric values in the data of each high subplane D1H, which has been encoded at the run-length encoding section 551. Furthermore, at the data scanning section 552, a code with a shorter code length is assigned to a numeric value with a higher appearance frequency in a Huffman table based on the determined data histogram (the appearance frequencies of numeric values). This data scanning section 552 corresponds to both of an example of the histogram calculation section and an example of the code assignment section according to the present invention.

The Huffman table in which codes are assigned to numeric values by the data scanning section 552 is handed to the Huffman encoding section 553. At the Huffman encoding section 553, encoding processing is performed in which each of the numeric values constituting the data inputted to the Huffman encoding section 553 is replaced with such a code as is in accordance with the Huffman table, that is, such a code as is indicated by a shorter bit length for a numeric value with a higher appearance frequency, in accordance with the handed Huffman table. This Huffman encoding section 553 corresponds to an example of the second encoding section according to the present invention.

Compression information including the assignment table including the numeric values and codes assigned at the data scanning section 552 is attached to the data which has been Huffman-encoded at the Huffman encoding section 553, and the data is outputted from the H plane compression section 550 as compressed high-order data D2H, which is the compressed high subplane D1H.

Thus, a combination of the compressed low-order data D2L and the compressed high-order data D2H outputted from the L plane compression section 540 and the H plane compression section 550, respectively, constitutes losslessly compressed data, which is the losslessly compressed true pixel data.

Meanwhile, the fake pixel data obtained at the thinning processing section 505 is inputted to the fake pixel compression section 560, and lossy compression processing is performed therefore. This fake pixel compression section 560 is provided with a bit shortening section 561, a run-length encoding section 562 and a Huffman encoding section 563. The numeric values constituting fake pixel data are replaced with one-bit or four-bit codes at the bit shortening section 561. Then, quite the same processing as the processing at the H plane compression section 550 is performed by the run-length encoding section 562 and the Huffman encoding section 563. As a result, lossily compressed data D3, which is the lossily compressed fake pixel data, is outputted from the fake pixel compression section 560.

Compressed data of the original data is constituted by the losslessly compressed data of the true pixel data and the lossily compressed data of the fake pixel data. This compressed data is transferred to the interface device 200 via the general-purpose interface 150, such as SCSI cable, shown in FIG. 1. At the interface device 200, data expansion processing is performed for the received, compressed data. In this data expansion processing, decoding processing corresponding to each of the various encoding processings described with reference to FIG. 3 is performed, and almost the same image in the original input image file is recovered.

Figure 4:
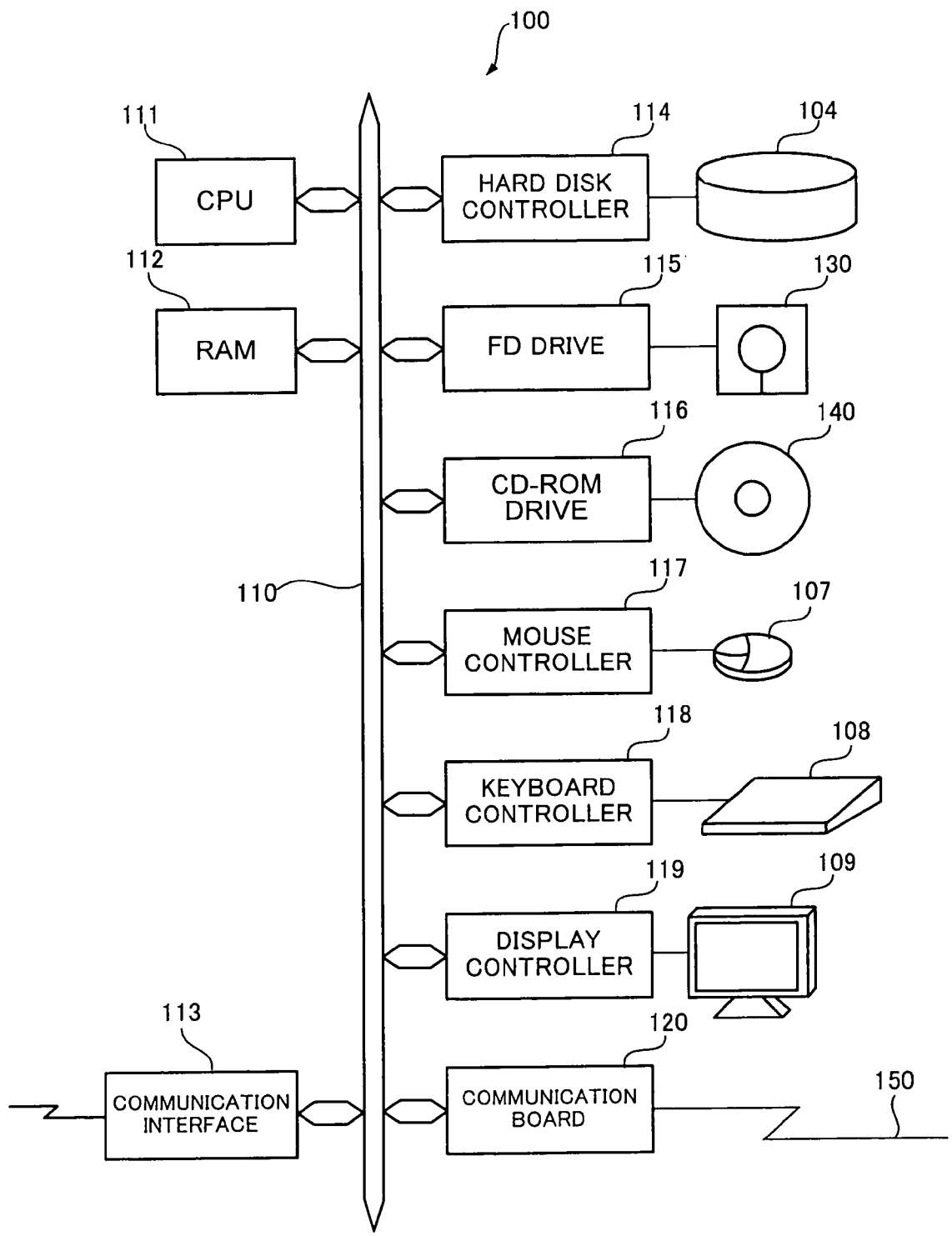
FIG. 4 is a hardware configuration diagram of a host controller shown in FIG. 1.

FIG. 4 is a hardware configuration diagram of the host controller shown in FIG. 1.

The host controller 100 shown in FIG. 1 is configured by a computer system with the configuration shown in FIG. 4.

The host controller 100 configured by the computer system, which is shown in FIG. 4, is provided with a CPU 111, a RAM 112, a communication interface 113, a hard disk controller 114, an FD drive 115, a CD-ROM drive 116, a mouse controller 117, a keyboard controller 118, a display controller 119 and a communication board 120, which are mutually connected via a bus 110.

The hard disk controller 114 controls access to a hard disk 104 included in the host controller 100, and the FD drive 115 and the CD-ROM drive 116 control access to a flexible disk (FD) 130 and a CD-ROM 140 which are removably mounted in the host controller 100, respectively. The mouse controller 117 and the keyboard controller 118 play a role of detecting operation of a mouse 107 and operation of a keyboard 108 provided for the host controller 100, respectively, and communicating the detection result to the CPU 111. The display controller 119 plays a role of displaying an image on a display screen of an image display 109 provided for the host controller 100, based on an instruction from the CPU 111.

The communication board 120 is in charge of communication in conformity with a general-purpose interface protocol such as SCSI and plays a role of transferring compressed image data to the interface device 200 via the interface cable 150 (see FIG. 1).

The communication interface 113 is in charge of general-purpose communication such as communication via the Internet, and the host controller 100 is also capable of acquiring image data via this communication interface 113.

In the RAM 112, a program stored in the hard disk 104 is read and developed to be executed by the CPU 111, and the CPU 111 reads and executes the program developed in the RAM 112.

Figure 5:
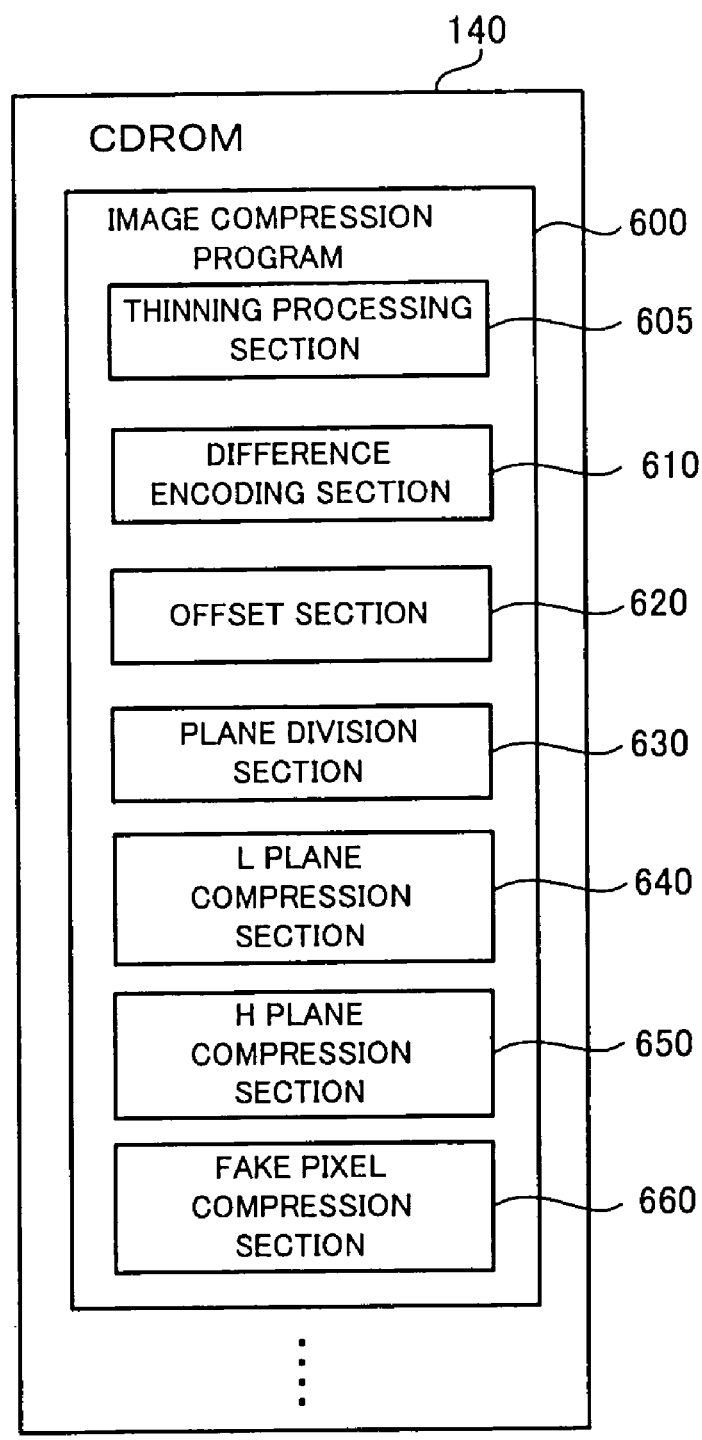
FIG. 5 is a schematic block diagram of an image compression processing program stored in a CD-ROM corresponding to a first embodiment of the data compression program storage medium of the present invention.

FIG. 5 is a schematic block diagram of an image compression processing program stored in a CD-ROM corresponding to a first embodiment of the data compression program storage medium of the present invention.

Here, an image compression program 600 is stored in the CD-ROM 140.

The image compression program 600 is configured by a thinning processing section 605, a difference encoding section 610, an offset section 620, a plane division section 630, an L plane compression section 640, an H plane compression section 650 and a fake pixel compression section 660. In the CD-ROM 140, there are also stored various programs for executing a series of processings in the host controller 100 shown in FIG. 1, in addition to the image compression program 600 shown here. However, illustration and description thereof will be omitted because they are similar to the conventional one.

The CD-ROM 140 shown in FIG. 5 is mounted in the host controller 100 shown in FIG. 4 and accessed by the CD-ROM drive 116. Then, the program stored in the CD-ROM 140 is uploaded to the host controller 100 and stored in the hard disk 104. When the program stored in the hard disk 104 is read from the hard disk 104, developed in the RAM 112 and executed by the CPU 111, the host controller 100 operates as an apparatus for executing various processings to perform as a host controller, including the processings to perform as the image compression apparatus 500 shown in FIG. 3.

Here, the image compression program 600 shown in FIG. 5 realizes the image compression apparatus 500 shown in FIG. 3 in the host controller 100 by being installed in the host controller 100 and executed by the CPU 111. The thinning processing section 605, the difference encoding section 610, the offset section 620, the plane division section 630, the L plane compression section 640, the H plane compression section 650 and the fake pixel compression section 660 are program modules for causing the host controller 100 to operate as the thinning processing section 505, the difference encoding section 510, the offset section 520, the plane division section 530, the L plane compression section 540, the H plane compression section 550 and the fake pixel compression section 560 which constitute the image compression apparatus 500 shown in FIG. 3, respectively, by being executed by the CPU 111. That is, the components of the image compression apparatus 500 are substantially constructed on the host controller 100 by these program modules.

The operations of the sections 605 to 660 constituting the image compression program 600 in FIG. 5 performed when they are executed by the CPU 111 are just the same operations of the sections 505 to 560 constituting the image compression apparatus 500 in FIG. 3, respectively. Therefore, the description which has been made on each of the sections 505 to 560 of the image compression apparatus 500 in FIG. 3 and detailed description below are also regarded as description about each of the sections 605 to 660 constituting the image compression program 600 in FIG. 5.

Figure 6:
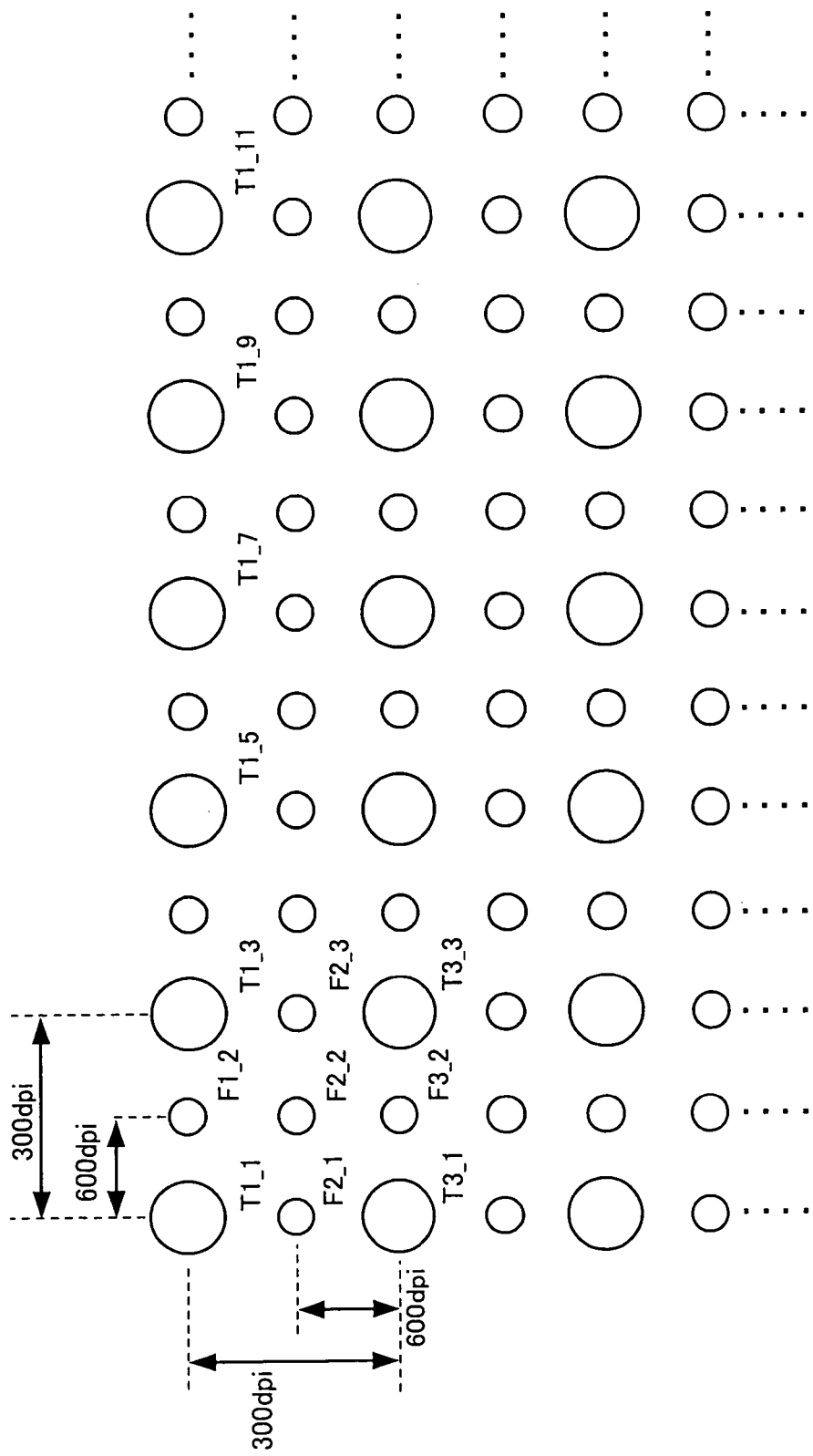
FIG. 6 shows the data structure of image data in an input image file to be inputted to the image compression apparatus in FIG. 3, and the concept of thinning processing.

FIG. 6 shows the data structure of image data in an input image file to be inputted to the image compression apparatus 500 in FIG. 3, and the concept of thinning processing.

As shown in FIG. 6, in image data to be inputted to the image compression apparatus 500 shown in FIG. 3, pixels are arranged in a predetermined horizontal scanning (main scanning) direction (horizontal direction of the figure) and a vertical scanning (sub scanning) direction perpendicular to the horizontal scanning direction (the vertical direction of the figure). The sequence of pixels arranged in the horizontal scanning direction is referred to a saline. Here, there are shown pixels corresponding to eight lines, and the interval between pixels corresponds to a resolution of 600 dpi.

The position of each pixel is expressed by a subscript attached to a symbol T or F indicating a pixel value. For example, as for the third line, the pixel values of the pixels arranged in the horizontal scanning direction are attached with $3\_1, 3\_2, 3\_3, 3\_4, \ldots$ in order of arrangement.

Image data constituted by pixel values arranged as described above is inputted to the thinning processing section 505 which constitutes the image compression apparatus 500 shown in FIG. 3, and each pixel is classified as a true pixel or a fake pixel. Among the pixels shown in FIG. 6, the pixel value of each true pixel is indicated by a symbol T, and the pixel value of each fake pixel is indicated by a symbol F. The true pixels are pixels which are cyclically thinned out from a sequence of pixels. Here, for every other line (each odd line) in the vertical scanning direction, every other pixel (each odd pixel) in the horizontal scanning direction is thinned out as a true pixel, as an example. As a result, in the example shown in FIG. 6, the true pixels correspond to such pixels that constitute an image the resolution of which has decreased from the original 600 dpi to 300 dpi, and this means that pixels corresponding to one-fourth of the original image data have been thinned out. The true pixels thinned out as described above constitute true pixel data configured by a sequence of such true pixels. The true pixel data has a structure in which pixels are arranged in the horizontal scanning direction and the vertical scanning direction, similarly to the original image data. The fake pixels left after the thinning of the true pixels also constitute fake pixel data configured by a sequence of the fake pixels.

As the method for thinning out true pixels, other methods, for example, a method in which pixels corresponding to one-ninth of original image data are thinned out by thinning out, for every two other lines in the vertical scanning direction, every second pixel in the horizontal scanning direction, or a method in-which the thinning cycle differs in the horizontal scanning direction and in vertical scanning direction, can be also adopted in addition to the above method. Here, the description will be continued on the assumption that every odd pixel on every odd line has been thinned out as shown in FIG. 6.

The true pixel data obtained in this way is inputted to the difference encoding section 510 constituting a part of the image compression apparatus 500 in FIG. 3, and difference encoding processing is performed therefore.

Figure 7:
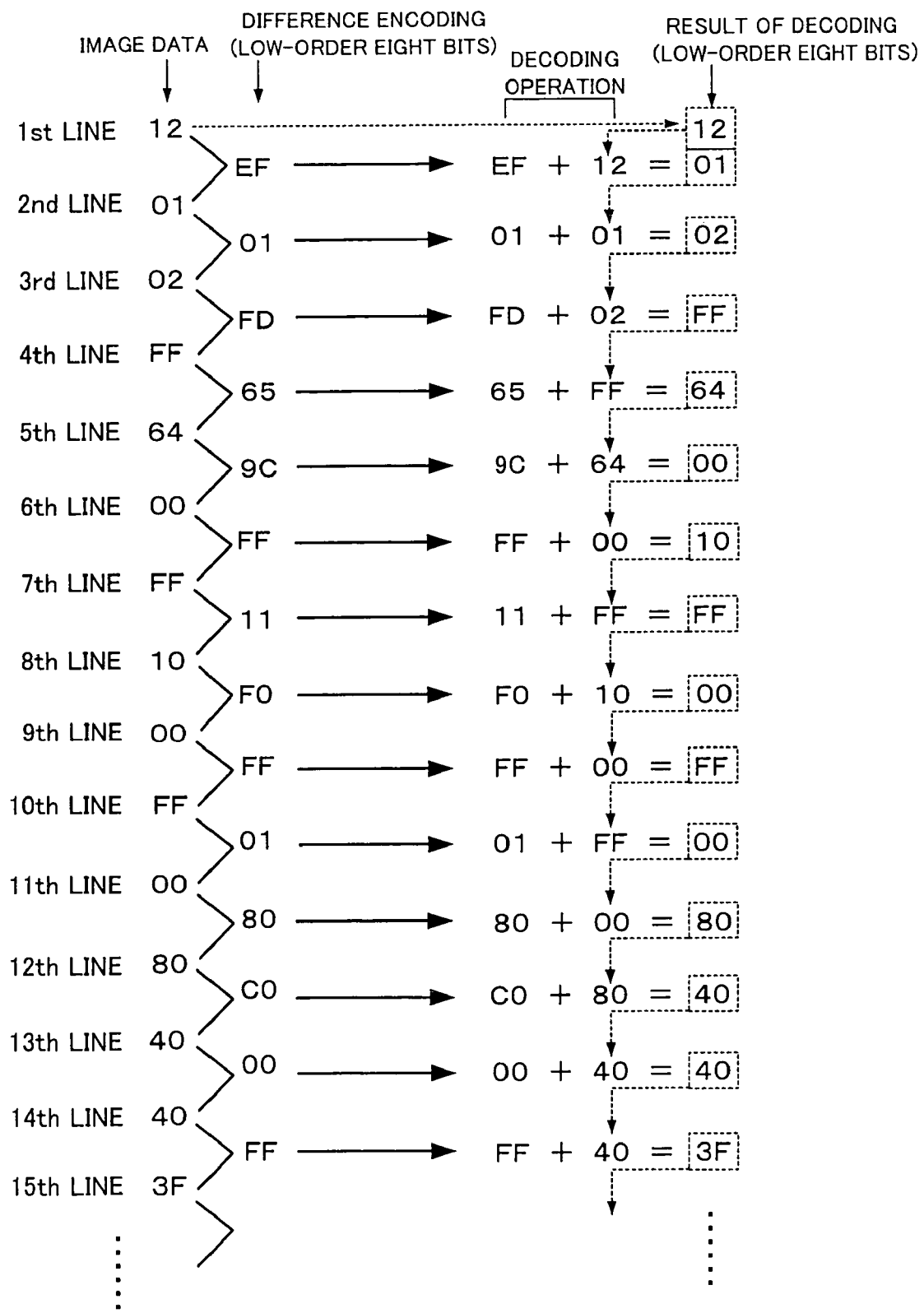
FIG. 7 illustrates difference encoding processing performed at a difference encoding section constituting a part of the image compression apparatus in FIG. 3.

FIG. 7 illustrates the difference encoding processing performed at the difference encoding section 510 constituting a part of the image compression apparatus 500 in FIG. 3.

Here, it is assumed that the pixel values on a certain vertical column, which are arranged in the vertical scanning direction shown in FIG. 6, are:

"12 01 02 FF 64 . . . 40 40 3F . . . "

as shown in the "image data" field in FIG. 7. In this case, each pixel value is expressed by hexadecimal two digits (1 byte=8 bits), and a "line" refers to pixels arranged in the horizontal scanning direction.

First, the pixel value "12" on the first line is outputted as it is.

Next, the pixel value "12" on the first line is subtracted from the pixel value "01" on the second line, and the result is outputted. The result of subtracting "12" from "01" is a negative number and is indicated as "1EF" by nine bits. However, the MSB one bit "1" is omitted, and only the low-order eight bits "EF" is outputted.

Next, the pixel value "01" on the second line is subtracted from the pixel value "02" on the third line, and the result value "01" is outputted.

Next, the pixel value "02" on the third line is subtracted from the pixel value "EF" on the fourth line, and the result value "FD" is outputted.

Next, the pixel value "FF" on the fourth line is subtracted from the pixel value "64" on the fifth line. The MSB one bit "1" is omitted from the result value, and the low-order eight bits, "65" is outputted.

Figure 8:
FIG. 8 shows an example of CT image data.
Figure 8:
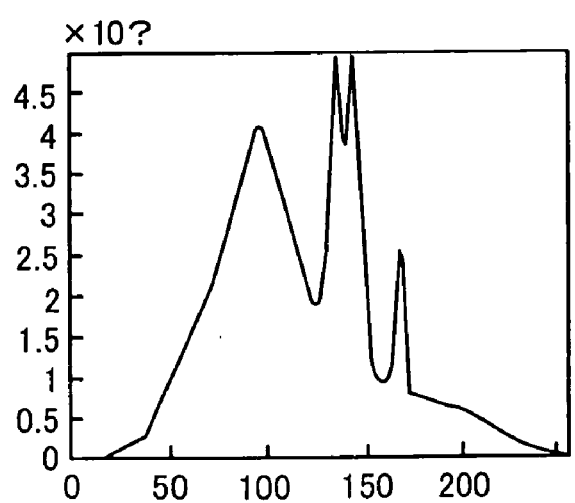

By subsequently repeating the same calculation, the following is outputted:

"(12) EF 01 FD 65 . . . L0 00 EF . . . "

which is shown in the "difference encode (low-order eight bits)" field in FIG. 8.

In the interface device 200 shown in FIG. 1, the calculation shown on the right side of FIG. 7 is performed when the differentially encoded data is decoded.

First, the pixel value "12" on the first line is as it is.

The pixel value on the second line is "01" which is indicated by the low-order eight bits among the result of adding the pixel value "12" on the first line to the difference value "EF".

The pixel value on the third line is "02" which is determined by adding the pixel value "01" on the second line, which has been determined in the above calculation, to the difference value "01".

The pixel value on the fourth line is "FF" which is determined by adding the pixel value "02" on the third line, which has been determined in the above calculation, to the difference value "FD".

The pixel value on the fifth line is "64" which is indicated by the low-order eight bits among the result of adding the pixel value "FF" on the fourth line, which has been determined in the above calculation, to the difference value "65".

By subsequently repeating similar calculation, the data is decoded to the same data before the difference encoding.

At the difference encoding section 510 in FIG. 3, the difference encoding as described above is performed for the true pixel data. The data obtained by this difference encoding is inputted to the offset section 520 in FIG. 3, and a predetermined offset value is added to each numeric value of the data.

Here, description will be made on the effect of the difference encoding and the offset with the use of concrete CT image data as an example.

FIG. 8 shows an example of CT image data.

In Part (A) of FIG. 8, a monochrome scenery image is shown as an example of a CT image indicated by the CT image data. In this embodiment, image data is used in which the color density of each pixel in such a CT image is expressed by an eight-bit numeric value. Part (B) of FIG. 8 shows a histogram of the data values of the image data indicating the scenery image shown in Part (A). The horizontal axis of this histogram indicates data values, and the vertical axis indicates the number of data (the number of pixels). The histogram width for a CT image is generally large, and it is extremely rare that an area where the number of data is "0" occurs on the histogram even if the number of data may significantly fluctuate.

Figure 9:
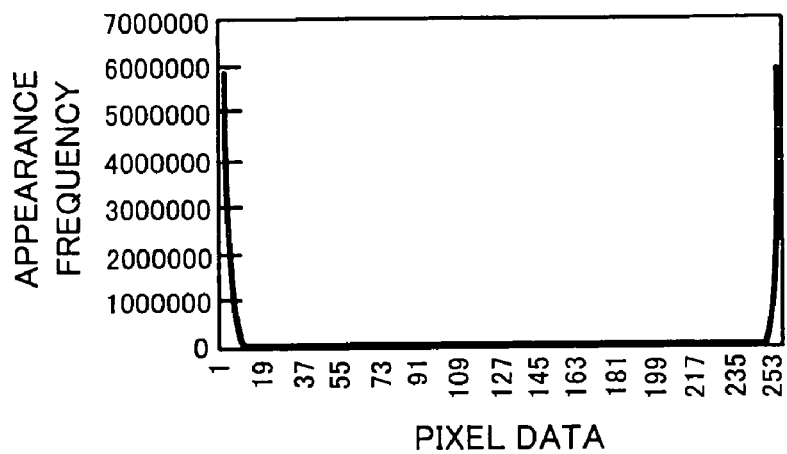
FIG. 9 shows effect of the difference encoding and of offset on CT image data.
Figure 9:
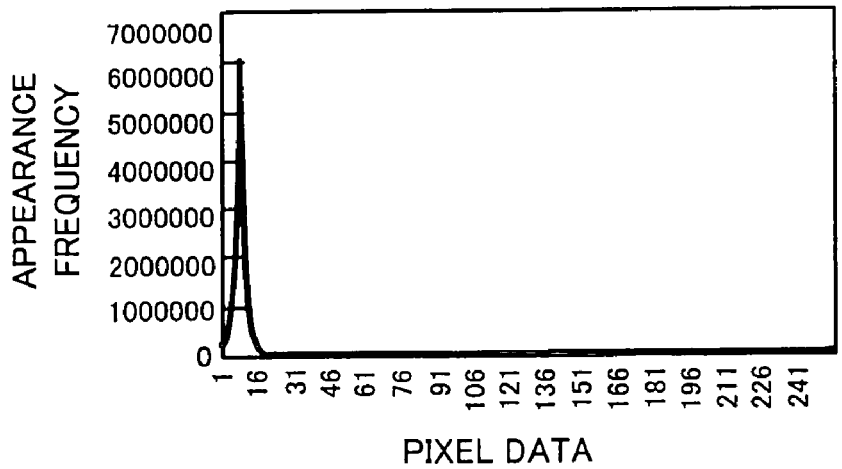

FIG. 9 shows the effect of the difference encoding and of the offset on CT image data.

In Part (A) of FIG. 9, there is shown a histogram of data obtained by performing difference encoding for the CT image data shown in FIG. 8. The horizontal axis of this histogram indicates data values, and the vertical axis indicates appearance frequencies. When the difference encoding described with reference to FIGS. 6 and 7 is performed for CT image data, the histogram of the data is generally such that has sharp peaks at the minimum and maximum data values as shown in Part (A) of FIG. 9. When offset is performed for such data, the histogram of the data is such that has a sharp peak at the offset value as shown in Part (B) of FIG. 9. In this embodiment, "8" is used as the offset value, and the frequency of data the value of which is equal to or above "16" is almost "0" as a result of the offset.

The data the histogram of which has been transformed by the difference encoding and the offset in this way is divided into a low subplane and a high subplane by the plane division section 530 in FIG. 3.

Figure 10:
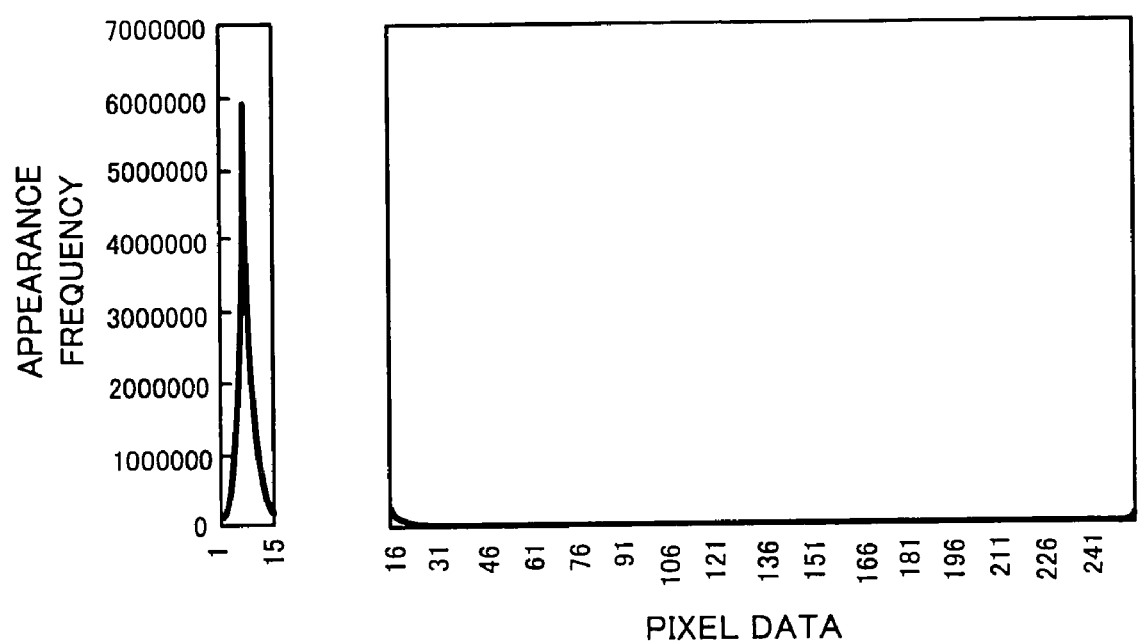
FIG. 10 illustrates effect of data division by a plane division section.

FIG. 10 illustrates the effect of the data division by the plane division section 530.

FIG. 10 shows the histogram in Part (B) in FIG. 9 which has been divided at the position between the data value "15" and the data value "16". The data division by the plane division section 530 in FIG. 3 gives an effect just corresponding to such histogram division. That is, in this embodiment, each of the eight-bit numeric values constituting data is divided into high-order four bits and low-order four bits, and thereby, a low subplane configured by a sequence of numeric values indicated by low-order four bits and a high subplane configured by a sequence of numeric values indicated by high-order four bits are obtained. If it is construed that the four-bit numeric values constituting the low subplane express the numeric values of "0" to "15", respectively, and the four-bit numeric values constituting the high subplane express sixteen kinds of numeric values between the values "16" and "256" at sixteen intervals, then the histogram of the low subplane is almost the same as the histogram shown on the left side of FIG. 10, and the histogram of the high subplane is almost the same as the histogram shown on the right side of FIG. 10. However, as for the histogram of the high subplane, a peak with a height equal to the area of the histogram shown on the left side of FIG. 10 is added at the data value "16" of the histogram shown on the right side of FIG. 10.

Such a high subplane is inputted to the run-length encoding section 551 constituting a part of the H plane compression section 550 shown in FIG. 3.

In this embodiment, consecutive two of the four-bit numeric values constituting the high subplane are treated as one eight-bit numeric value at the run-length encoding section 551 for convenience of processing. The following encoding processing is applied to the sequence of hexadecimal numeric values from the value "00" to the value "FF".

This encoding processing is performed only for particular numeric values among the multiple eight-bit numeric values. Therefore, at this run-length encoding section 551, the numeric values for which the encoding processing is to be performed (hereinafter referred to as "numeric values to be compressed") and the number of continuations of each of the values to be compressed are detected from the received data.

In this embodiment, the three numeric values of "01", "FF" and "00" are assumed to be the numeric values to be compressed, as an example.

FIG. 11 illustrates the encoding at the run-length encoding section 551 shown in FIG. 3.

The upper line in FIG. 11 indicates the data constituting the high subplane, and the lower line indicates the data for which the encoding processing at the run-length encoding section 551 has been performed.

As shown by the upper line in FIG. 11, it is assumed that the following data has been inputted from the run-length encoding section 551:

"06 02 02 02 01 01 01 01 04 05 00 . . . "

In this case, it is detected by the run-length encoding section 551 in FIG. 3 that the top "06" is not a numeric value to be compressed, that the subsequent "02 02 02" are also not numeric values to be compressed, that "01", a numeric value to be compressed, continuously appears four times next, and that there are "04" and "05" which are not numeric values to be compressed, after which "00", a numeric value to be compressed, continuously appears 32,767 times next.

Figure 12:
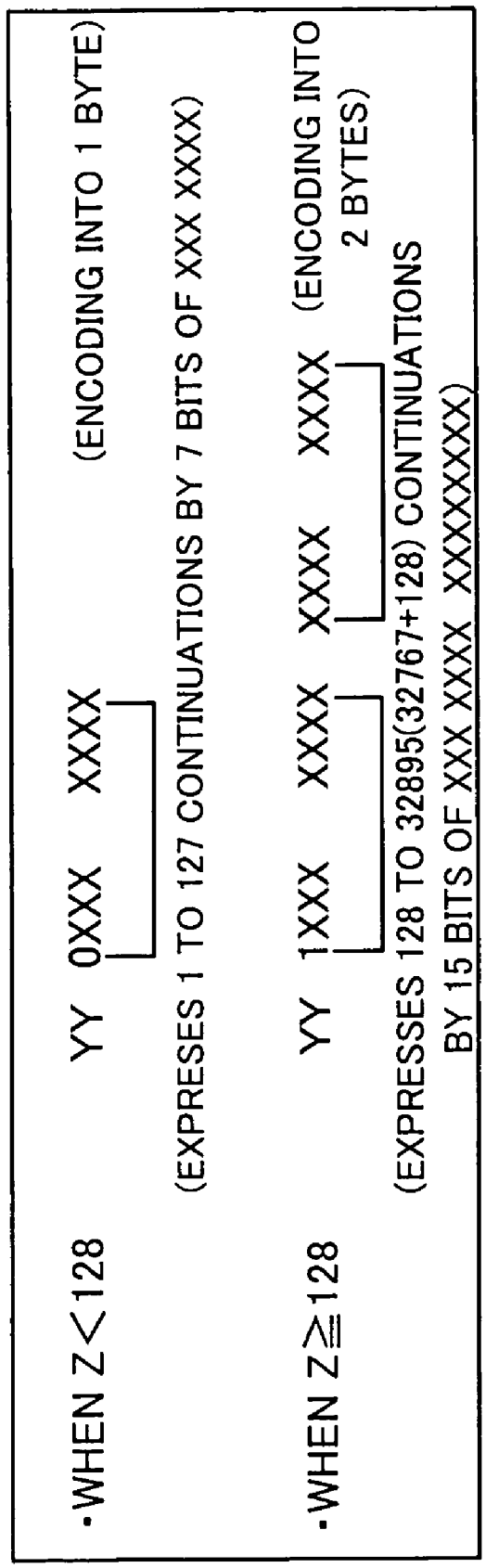
FIG. 12 shows an algorithm for encoding of numeric values to be compressed which is performed at the run-length encoding section.

FIG. 12 shows an algorithm for the encoding of numeric values to be compressed which is performed at the run-length encoding section.

In FIG. 12, Z denotes the number of continuations of the same numeric value to be compressed, for example, Z=4 for "01" and Z=32767 for "00" on the upper line in FIG. 11.

In FIG. 12, "YY" denotes a numeric value to be compressed, which is indicated by hexadecimal two digits. The "0" or "1" subsequent to "YY" is "0" or "1" expressed by one bit. As for the subsequent "XX . . . ", one "X" thereof indicates one bit, and the "XX . . . " expresses the value of "Z".

That is, FIG. 12 means that, when the numeric value to be compressed "YY" continues Z times (Z<128), the first byte expresses the numeric value to be compressed "YY", the top bit of the subsequent one byte expresses "0", and the subsequent seven bits expresses the value of Z; and that, when the numeric value to be compressed "YY" continues Z times (Z≧128), the first byte expresses the numeric value to be compressed "YY", "1" set as the top bit of the subsequent two bytes (sixteen bits) indicates that expression straddles two bytes, and the subsequent fifteen bits expresses the value of Z.

Description will be made on an example of the encoding shown in FIG. 11 in accordance with the rules shown in FIG. 12.

The top numeric value "06" of the numeric values constituting the data of the high subplane inputted from the plane division section 530 in FIG. 3 (the upper line) is not a numeric value to be compressed, and therefore, the "06" is outputted. As for the subsequent "02 02 02", the three "02s" are outputted as they are because "02" is not a numeric value to be compressed. Next, "01", which is a numeric value to be compressed, continuously appears four times, and the values are encoded into "01 04". The next "04" and "05" are not numeric value to be compressed, and therefore, "04 05" is outputted as it is.

Next, "00" continuously appears 32,767 times. Therefore, by placing "00", setting the top one bit of the next one byte to "1", and then expressing 32767-128 with fifteen bits, it is expressed that "00" continuously appears 32,767 times, by three bytes of "00 FF 7F". That is, the number of continuations 128 is expressed by "00 00" excluding the first bit "1".

Figure 13:
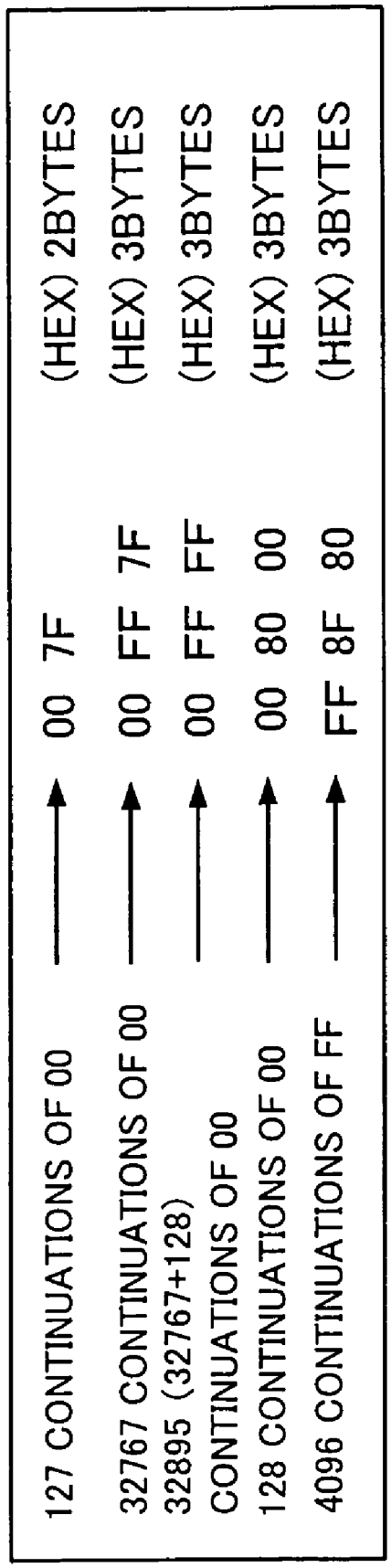
FIG. 13 shows an example of encoding processing according to the number of continuations which is performed at the run-length encoding section in FIG. 3.

FIG. 13 shows an example of encoding processing according to the number of continuations which is performed at the run-length encoding section 551 in FIG. 3.

When "00" continuously appears 127 times, the one-hundred and twenty-seven "00s" are encoded into "00 7F" with two bytes;

When "00" continuously appears 32,767 times, the thirty-two thousand seven-hundred and sixty-seven "00s" are encoded into "00 FF 7E" with three bytes;

When "00" continuously appears 32,895 times, the thirty-two thousand eight-hundred and ninety-five "00s" are encoded into "00 FF FF" with three bytes;

When "00" continuously appears 128 times, the one-hundred twenty-eight "00s" are encoded into "00 80 00" with three bytes; and When "FF" continuously appears 4,906 times, the four-thousand and ninety-six "FFs" are encoded into "00 8F 80" with three bytes.

At the run-length encoding section 551 shown in FIG. 3, the encoding processing as described above is performed.

By the run-length encoding section 551 according to this embodiment, the maximum compression ratio is improved to 3/32895=1/10,965. As described with reference to the histogram in FIG. 10, most of the four-bit numeric values of the data of the high subplane which is targeted by the encoding processing by the run-length encoding section 551 are the numeric value "0" expressing the data value "16", and most of the eight-bit numeric values created from the four-bit numeric values are the hexadecimal numeric value "00". Therefore, significant data compression is expected by the encoding processing at the run-length encoding section 551.

The data for which the above-described encoding processing has been performed at the run-length encoding section 551 in FIG. 3 is then inputted to the data scanning section 552 and the Huffman encoding section 553 constituting a part of the H plane compression section 550 in FIG. 3.

At the data scanning section 552, the entire data outputted from the run-length encoding section 551 is scanned to determine the appearance frequencies of data values.

Figure 14:
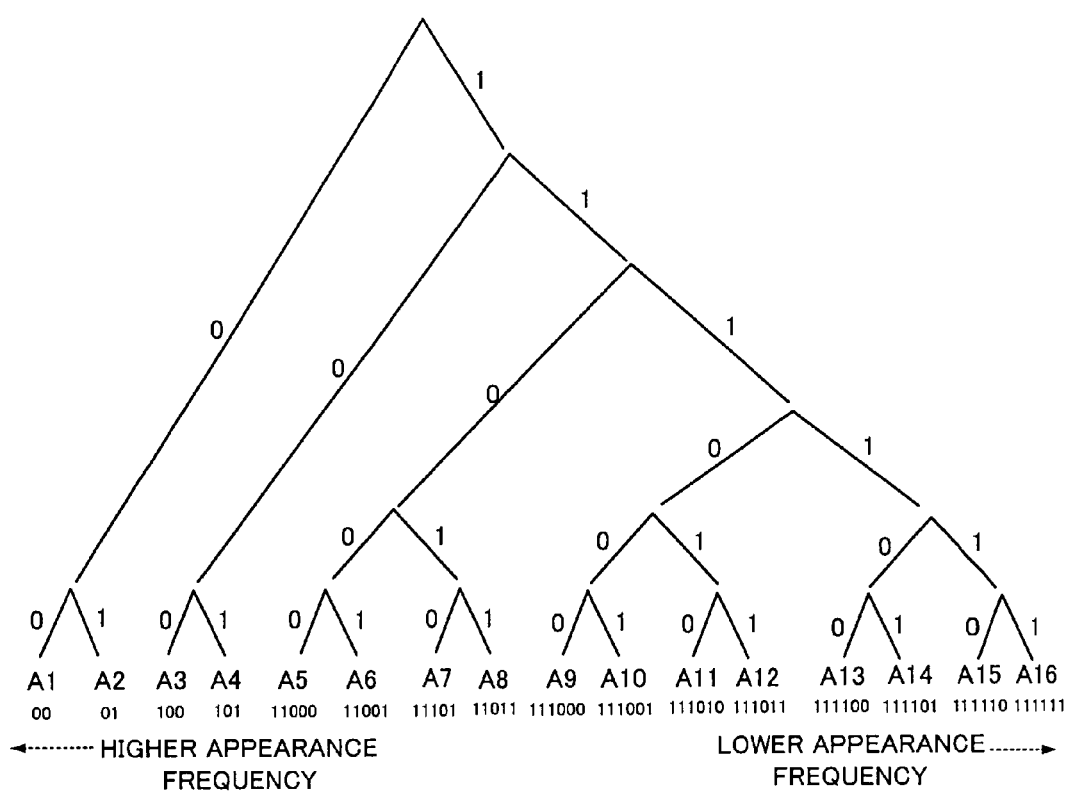
FIG. 14 shows an example of the result of scanning by a data scanning section.

FIG. 14 shows an example of the result of the scanning by the data scanning section 552.

Here, it is assumed that the appearance frequency of "A1" is the highest, and the appearance frequencies of "A2", "A3", "A4", . . . are higher in that order. The "A1", "A2" and the like do not directly indicate numeric values, but they are only symbols indicating numeric values. That is, "A1" is, for example, a numeric value "00"; "A2" is a numeric value "FF", and so on. Furthermore, for simplification, it is assumed that each of all data values of data sent from the run-length encoding section 551 in FIG. 3 is any of the sixteenth numeric values "A1" to "A16". At the data scanning section 552, a code according to the appearance frequency is assigned to each of the sixteen numeric values, and a Huffman table is created. That is, a code "00" indicated by two bits is assigned to "A1" with the highest appearance frequency; a code "01" which is also indicated by two bits is assigned to the next "A2"; codes "100" and "101" indicated by three bits are assigned to the next "A3" and the further next "A4", respectively; codes indicated by five bits are assigned to the following "A5" to "A8", respectively; and, similarly, a code indicated by a larger number of bits is assigned to a numeric value with a lower appearance frequency.

FIG. 15 shows an example of the Huffman table.

This Huffman table corresponds to FIG. 14, and it is a table for associating numeric values before encoding (before replacement) and numeric values after encoding (after replacement), in which the numeric values are arranged so that a numeric value with a higher appearance frequency is replaced with a code indicated by a smaller number of bits.

At the Huffman encoding section 553 constituting a part of the H plane compression section 550 in FIG. 3, numeric values of data are encoded in accordance with such a Huffman table. As a result, a lot of numeric values are replaced with codes with a smaller number of bits, and thereby data compression is realized.

In this way, a high subplane D1H inputted to the H plane compression section 550 in FIG. 3 is compressed at a high compression ratio by the encoding by the run-length encoding section 551 and the encoding by the Huffman encoding section 553 being performed therefore, and becomes compressed high-order data D2H.

At the Huffman encoding section 541 of the L plane compression section 540 in FIG. 3, two four-bit numeric values are treated as one eight-bit numeric value and processed, similarly to the run-length encoding section 551 of the H plane compression section 550. In this encoding processing by the Huffman encoding section 541, processing similar to the encoding processing by the Huffman encoding section 553 of the H plane compression section 550 is executed except that a fixed Huffman table is used in this encoding processing. As a result, a low subplane D1L becomes compressed low-order data D2L.

By the various processings as described above being executed by the difference encoding section 510, the offset section 520, the plane division section 530, the L plane compression section 540 and the H plane compression section 550 shown in FIG. 3, the true pixel data is compressed by lossless compression, and significant compression is realized especially for data of a CT image.

Meanwhile, the fake pixel data obtained at the thinning processing section 505 described above is inputted to the fake pixel compression section 560 shown in FIG. 3 and lossily compressed.

The fake pixel data inputted to the fake pixel compression section 560 is handed to the bit shortening section 561. At the bit shortening section 561, for the pixel value of each of the fake pixels constituting the fake pixel data, the pixel values of two true pixels surrounding the fake pixel on the original image data are determined first, and the pixel value of the fake pixel is compared with the pixel values of these true pixels. The fake pixels shown in FIG. 6 are classified into three systems according to the positional relation with true pixels. That is, when the pixel value of a true pixel is expressed by $T_{n\_k}$, then the pixel value of a fake pixel is expressed by any of three kinds of expressions of $F_{n\_k+1}$, $F_{n+1\_k}$, and $F_{n+1\_k+1}$. Among the fake pixels of the three kinds, as for the pixel value of a fake pixel having the pixel value expressed as $F_{n\_k+1}$, it is compared with the pixel values $T_{n\_k}$ and $T_{n\_k+2}$ of the two true pixels surrounding the fake pixel in the horizontal scanning direction. As for the pixel value of a fake pixel having the pixel value expressed as $F_{n+1\_k}$, it is compared with the pixel values $T_{n\_k}$ and $T_{n+2\_k}$ of the two true pixels surrounding the fake pixel in the vertical scanning direction. Furthermore, as for the pixel value of a fake pixel having the pixel value expressed as $F_{n+1\_k+1}$, it is compared with the pixel values $T_{n\_k}$ and $T_{n+2\_k+2}$ of the two true pixels surrounding the fake pixel in an oblique direction.

Next, at the bit shortening section 561, the pixel value of the fake pixel is encoded into a four-bit code which begins with a one-bit code "0" or "1" based on the comparison result.

Figures 16, 17:
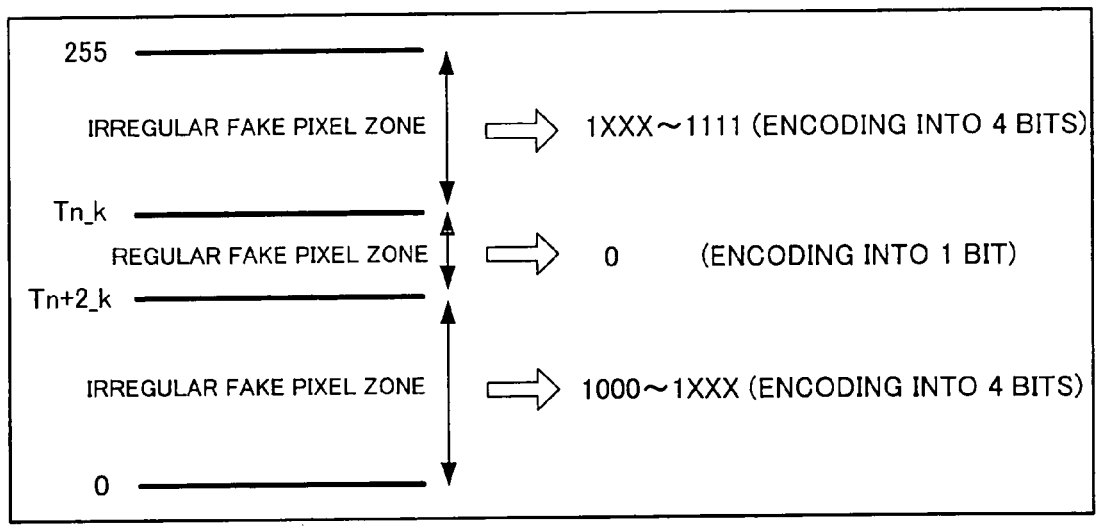
FIG. 16 shows the concept of encoding performed at a bit shortening section.
FIG. 17 shows a first encoding method for encoding into a four-bit code.

FIG. 16 shows the concept of the encoding performed at the bit shortening section.

Here, description will be made on the fake pixel with the pixel value expressed as $F_{n+1\_k}$ among the fake pixels of the three kinds described above, as a representative. If the pixel value $F_{n+1\_k}$ of the fake pixel exists in a regular fake pixel zone between the pixel values $T_{n\_k}$ and $T_{n+2\_k}$ of two true pixels, then the pixel value is encoded into a one-bit code "0" indicating that it exists in the regular fake pixel zone. If the pixel value $F_{n+1\_k}$ of the fake pixel exists in a irregular fake pixel zone, a zone left after the regular fake pixel zone is excluded from the numeric value range from 0 to 255 which can be expressed by eight bits, then the pixel value is encoded into a four-bit code beginning with "1" as describe below.

FIG. 17 shows a first encoding method for encoding into a four-bit code.

In this first encoding method, the pixel value $F_{n\_k+1}$ of the fake pixel is encoded into a code between "1000" and "1111" by rounding down the low-order five digits of the eight-bit value indicating the pixel value $F_{n\_k+1}$ and adding "1" to the top of the remaining high-order three digits. Therefore, as shown in the table in this figure, the numeric values "0" to "31" among the numeric values "0" to "255" before encoding are encoded into "1000", and the numeric values "22" to "63" are encoded into "1001". Similarly the numeric values "64" to "95, "96" to "127", "128" to "159", "160" to "191", "192" to "223", and "224" to "255" are encoded into "1010", "1011", "1100", "1101", "1110" and "1111", respectively. Such first encoding method is realized by extremely simple processing of rounding down digits of a value.

By the encoding performed at the bit shortening section 561 in FIG. 3, the eight-bit pixel value of the fake pixel is shortened to one bit or four bits. In the case of a CT image, it is conceivable that, since correlation between adjacent pixels is high, the pixel values of many fake pixels exist in the regular fake pixel zone, and significant compression is possible.

Though, in this embodiment, the first encoding method described above is used for the encoding into a four-bit code, a second encoding method to be described below may be adopted by the bit shortening section according to the present invention.

Figure 18:
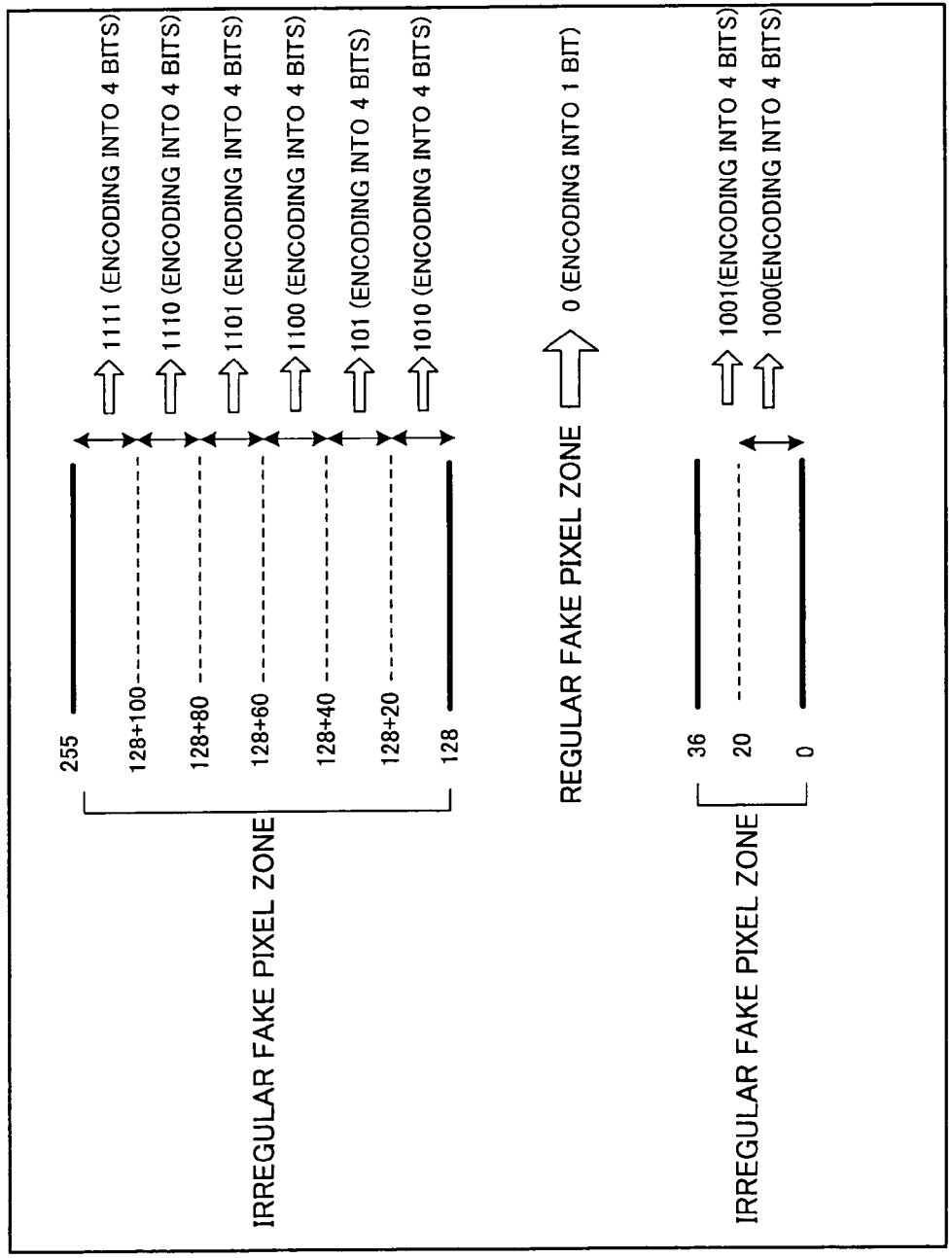
FIG. 18 shows a second encoding method for encoding into a four-bit code.

FIG. 18 shows a second encoding method for encoding into a four-bit code.

In this second encoding method, the numeric value range of the irregular fake pixel zone described above is divided into eight steps, and the steps are allocated to eight of the four-bit codes described above and encoded. For example, if the regular fake pixel zone is from "36" to "128", then the step size is determined as 20 from the formula below:

$$\{255-(128-36)\}/8=20.37, INT(20.38)=20$$

As shown in FIG. 18, the numeric values "0" to "20" are encoded into "1000", and the numeric values "21" to "36" are encoded into "1001". The numeric values "128" to "128+20" are encoded into "1010", and similarly, the numeric values "128+21" to "128+40", "128+41" to "128+60", "128+61" to "128+80", "128+81" to "128+100" and "128+101" to "255" are encoded into "1011", "1100", "1101", "1110" and "1111", respectively. In such second encoding method, encoding is limited to a necessary numeric value range, and therefore the accuracy is high.

In the data encoded at the bit shortening section 561 in FIG. 3, one-bit codes and four-bit codes are mixed. They are separated as eight-bit units (byte packing) for subsequent processing, and quite the same processing as the processing at the H plane compression section 550 is executed by the run-length encoding section 562 and the Huffman encoding section 563 in FIG. 3. In this case, the Huffman encoding section 563 plays both of the roles of the data scanning section 552 and the Huffman encoding section 553 described above.

In the case of a CT image, since many pixel values have been encoded into "0" by the encoding at the bit shortening section 561, they are expected to be significantly compressed by the run-length encoding section 562 after that.

Next a second embodiment of the data compression apparatus of the present invention will be described. Many of the components of this second embodiment are the same as those of the first embodiment described above. Therefore, as for the common components, the same reference numerals given in the first embodiment are given thereto, and redundant description will be omitted.

Figure 19:
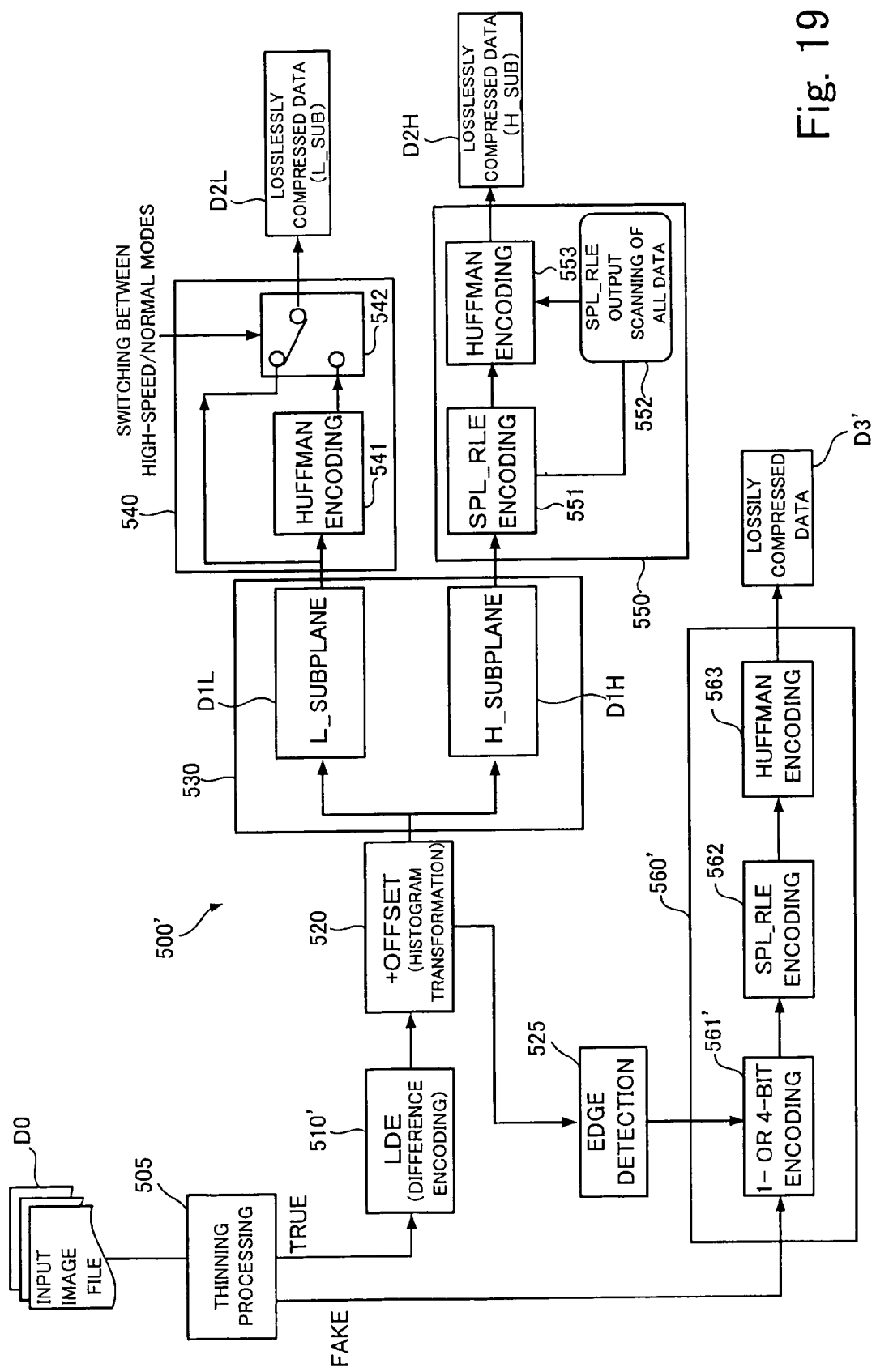
FIG. 19 is a block diagram showing an image compression apparatus corresponding to a second embodiment of the data compression apparatus of the present invention.

FIG. 19 is a block diagram showing an image compression apparatus corresponding to the second embodiment of the data compression apparatus of the present invention.

The image compression apparatus 500' shown in FIG. 19 is provided with a thinning processing section 505, a difference encoding section 510', an offset section 520, an edge detection section 525, a plane division section 530, an L plane compression section 540, an H plane compression section 550 and a fake pixel compression section 560'.

In this second embodiment, true pixel data is inputted to the difference encoding section 510', and two-dimensional difference encoding processing is performed, that is, processing for determining, for each numeric value of a sequence of numeric values constituting the inputted data, two-dimensional difference based on multiple numeric values adjacent to the numeric value in multiple directions when seen on the image and generating image data configured by a sequence of eight-bit numeric values indicating such differences. The difference encoding section 510' is an example of the difference generation section according to the present invention.

The image data configured by a sequence of numeric values indicating differences, which has been generated at the difference encoding section 510', is inputted to the offset section 520 and offset by a predetermined value. After that, it is inputted to the edge detection section 525 and the plane division section 530. At the edge detection section 525, an edge portion of the image is detected based on the offset difference values. The edge detection section 525 is an example of the determination section according to the present invention.

Meanwhile, the fake pixel data obtained at the thinning processing section 505 is inputted to the fake pixel compression section 560' and lossily compressed. This fake pixel compression section 560' is provided with a bit shortening section 561', a run-length encoding section 562 and a Huffman encoding section 563. Each of the numeric values constituting the fake pixel data is replaced with a one-bit or four-bit code at the bit shortening section 561'. In this case, the code replacement method differs according to whether or not the pixel corresponds to the edge portion detected by the edge detection section 525. After there placement with a one-bit or four-bit code, quite the same processing as the processing in the first embodiment is executed by the run-length encoding section 562 and the Huffman encoding section 563. As a result, lossily compressed data D3', which is the lossily compressed fake pixel data, is outputted from the fake pixel compression section 560'.

Figure 20:
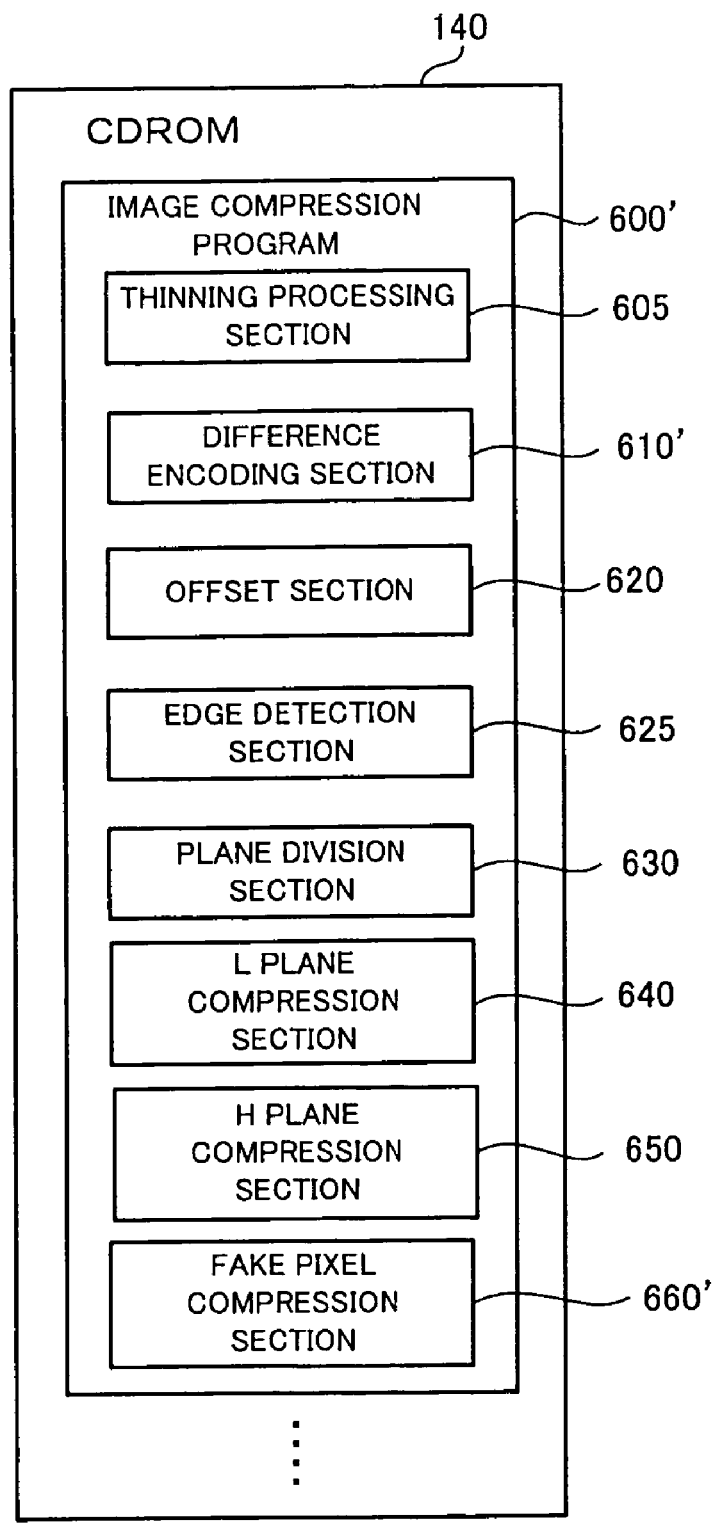
FIG. 20 is a schematic block diagram of an image compression processing program stored in a CD-ROM corresponding to a second embodiment of the data compression program storage medium of the present invention.

FIG. 20 is a schematic block diagram of an image compression processing program stored in a CD-ROM corresponding to a second embodiment of the data compression program storage medium of the present invention.

Here, an image compression program 600' is stored in a CD-ROM 140.

This image compression program 600' is configured by a thinning processing section 605, a difference encoding section 610', an offset section 620, an edge detection section 625, a plane division section 630, an L plane compression section 640, an H plane compression section 650 and a fake pixel compression section 660'. In this CD-ROM 140, there are stored various programs for executing a series of processings in the host controller 100 shown in FIG. 1, in addition to the image compression program 600' shown here. Since they are similar to conventional ones, illustration and description thereof will be omitted.

Here, the thinning processing section 605, the difference encoding section 610', the offset section 620, the edge detection section 625, the plane division section 630, the L plane compression section 640, the H plane compression section 650 and the fake pixel compression section 660' of the image compression program 600 shown in FIG. 20 are program modules which cause the host controller 100 to operate as each of the thinning processing section 505, the difference encoding section 510', the offset section 520, the edge detection section 525, the plane division section 530, the L plane compression section 540, the H plane compression section 550 and the fake pixel compression section 560' which constitute the image compression apparatus 500' shown in FIG. 19, by being executed by the CPU 111. That is, the components of the image compression apparatus 500' are substantially constructed on the host controller 100 by these program modules.

Figure 21:
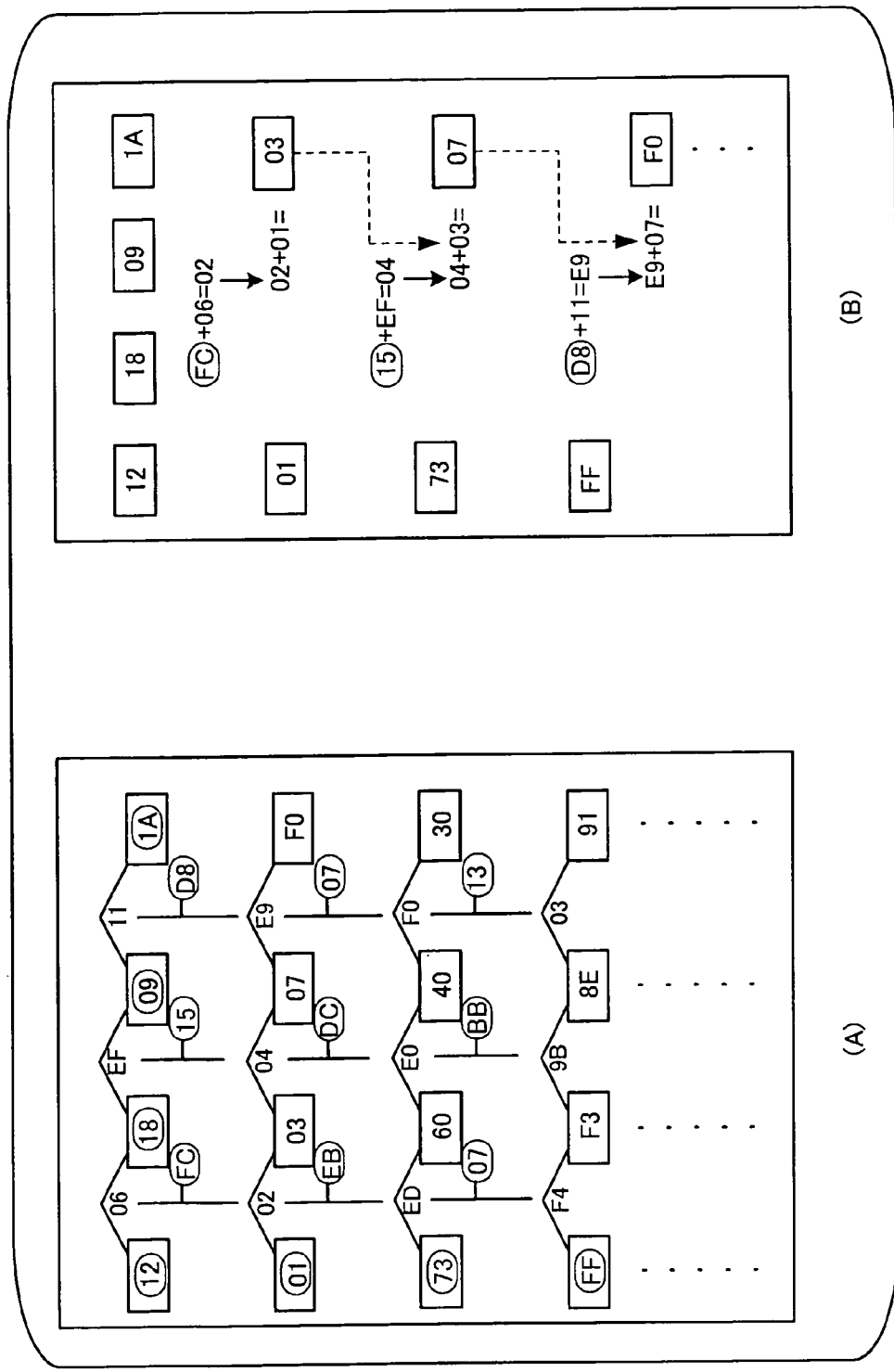
FIG. 21 illustrates two-dimensional difference encoding processing performed at a difference encoding section constituting a part of the image compression apparatus in FIG. 19.

FIG. 21 illustrates the two-dimensional difference encoding processing performed at the difference encoding section 510' constituting a part of the image compression apparatus 500' in FIG. 19.

Among the numeric values shown on the left side (Part (A)) of this figure, the numeric values surrounded by rectangles "12 18 09 1A . . . 01 03 07 F0 . . . " are pixel values constituting image data, and the numeric values surrounded by circles, "12 18 09 1A . . . 01 FC 15 D8 . . . " are output values outputted by the two-dimensional difference encoding processing. In the description below, a sequence of pixels arranged in the horizontal scanning (main scanning) direction (horizontal direction of the figure) is referred to as a "line".

In the two-dimensional difference encoding, each of the pixel values "12 18 09 1A . . . " on the first line is outputted as it is. Then, differences between pixel values which are adjacent in the horizontal scanning direction, "18−12=06", "09−18=EF", . . . are calculated. In this case, for example, the result of subtracting "18" from "09" is a negative number, which is indicated by "1EEF" with nine bits. However, the MSB one bit "1" is omitted, and only "EF" with the low-order eight bits is outputted.

Next, as for the second line, only the top pixel value "01" is outputted as it is, and then differences between pixel values which are adjacent in the horizontal scanning direction, "03−01=02", "07−03=04", . . . are calculated. Then, further differences "02−06=FC", "04−EF=15", . . . between the differences of the first line "06 EF 11." and the differences of the second line "02 04 E9 . . . " are determined and outputted.

Next, the same processing is performed for the third line similarly for the second line. Only the top pixel value "73" on the third line is outputted as it is, and differences between pixel values which are adjacent in the horizontal scanning direction, "60−73=ED", "40−60=E0" . . . are calculated. Then, further differences "ED−02=EB", "E0−04=DC" . . . between the differences of the second line "02 04 E9 . . . " and the differences of the third line "ED E0 F0 . . . " are determined and outputted.

By subsequently repeating the same calculation, the circled values in FIG. 7, "12 18 09 1A . . . 01 FC 15 D8 . . . 73 EB DC 07 . . . FF 07 BB 13 . . . " are outputted.

In the interface device 200 shown in FIG. 1, the calculation shown on the right side (Part (B)) of FIG. 21 is performed when the data for which the two-dimensional difference encoding has been performed is decoded.

First, each of the pixel values "12 18 09 1A . . . " on the first line is as it is.

The top pixel value on each of the second and subsequent lines, "01", "73", "FF" . . . is also as it is.

Here, description will be made on a procedure for decoding from difference values to original pixel values, with the difference values of the second and subsequent lines, "FC 15 D8 . . . " used as an example.

When decoding to a pixel value is performed, three pixel values at three pixels are used, that is, the pixel values at the pixel at the previous position on the same line as the targeted pixel (the left side in the figure), the pixel at the same position on the previous line (the upper side in the figure), and the pixel at the previous position on the previous line.

As for the difference value "FC" of the second pixel on the second line, the pixel value "12" of the top pixel on the first line, the pixel value "18" of the second pixel on the first line and the pixel value "01" of the top pixel on the second line are used, and the difference between the pixel values of the second and the top on the first line, "18−12=06" is determined. Then, "02", which is indicated by the low-order eight bits of the value resulting from adding the difference "06" to the targeted difference value "FC", is obtained, and "03", which is indicated by the low-order eight bits of the value resulting from adding the pixel value "01" of the top pixel on the second line to the value "02", is obtained as the second pixel value on the second line, as a result of the decoding.

The third pixel value on the second line is "07", which is indicated by the low-order eight bits of the value obtained as a result of further adding the second pixel value "03" on the second line to "04" indicated by the low-order eight bits of the value obtained as a result of adding the difference between the third and second pixel values "09−18=EF" to the difference value "15".

The fourth pixel value on the second line is "F0", which is indicated by the low-order eight bits of the value obtained as a result of further adding the third pixel value "07" on the second line to "09" indicated by the low-order eight bits of the value obtained as a result of adding the difference between the fourth and third pixel values "1A−09=11" to the difference value "D8".

By subsequently repeating similar calculation, each difference value is decoded to the same pixel value as the pixel value before the two-dimensional difference encoding being performed.

At the difference encoding section 510' in FIG. 19, the two-dimensional difference encoding as described above is performed for true pixel data.

The true pixel data is compressed by lossless compression in which the two-dimensional difference encoding is used, and significant compression is realized especially for CT image data.

Meanwhile, the fake pixel data obtained at the thinning processing section 505 described above is inputted to the fake pixel compression section 560' shown in FIG. 19 and lossily compressed.

The fake pixel data inputted to the fake pixel compression section 560' is handed to the bit shortening section 561'. At the bit shortening section 561', the fake pixel data is encoded into four bits or one bit according to whether or not it is an edge portion. In the case of the second embodiment, whether or not it is an edge portion is determined based on difference data after offset being performed therefor, by the edge detection section 525 in FIG. 19. If the high-order data of the difference data has a value other than "0" (that is, the difference is large), the fake pixel data is determined to be an edge portion. Though the content of the encoding processing is similar to that of the first embodiment, the accuracy of determining whether or not the fake pixel data is an edge portion is high, and it is expected that image quality deterioration is reduced.

Next, a third embodiment of the data compression apparatus of the present invention will be described. This third embodiment relates to an image compression apparatus to be incorporated in a host controller in the entire system shown in FIG. 1, and more specifically to processing for performing data compression for the CT bitmap data 12A and the LW bitmap data 13A in the host controller shown in FIG. 2. Accordingly, it is to be understood that the data compression processing for CT data and LW data described with reference to FIGS. 1 and 2 is replaced with the data compression processing as the embodiment of the present invention described below, and that the data expansion (decompression) processing in the interface device is also replaced with data expansion (decompression) processing corresponding to the data compression processing as the embodiment of the present invention. Redundant illustration and description similar to those about the entire system shown in FIG. 1 and the flow of the processing shown in FIG. 2 will be omitted.

Figure 22:
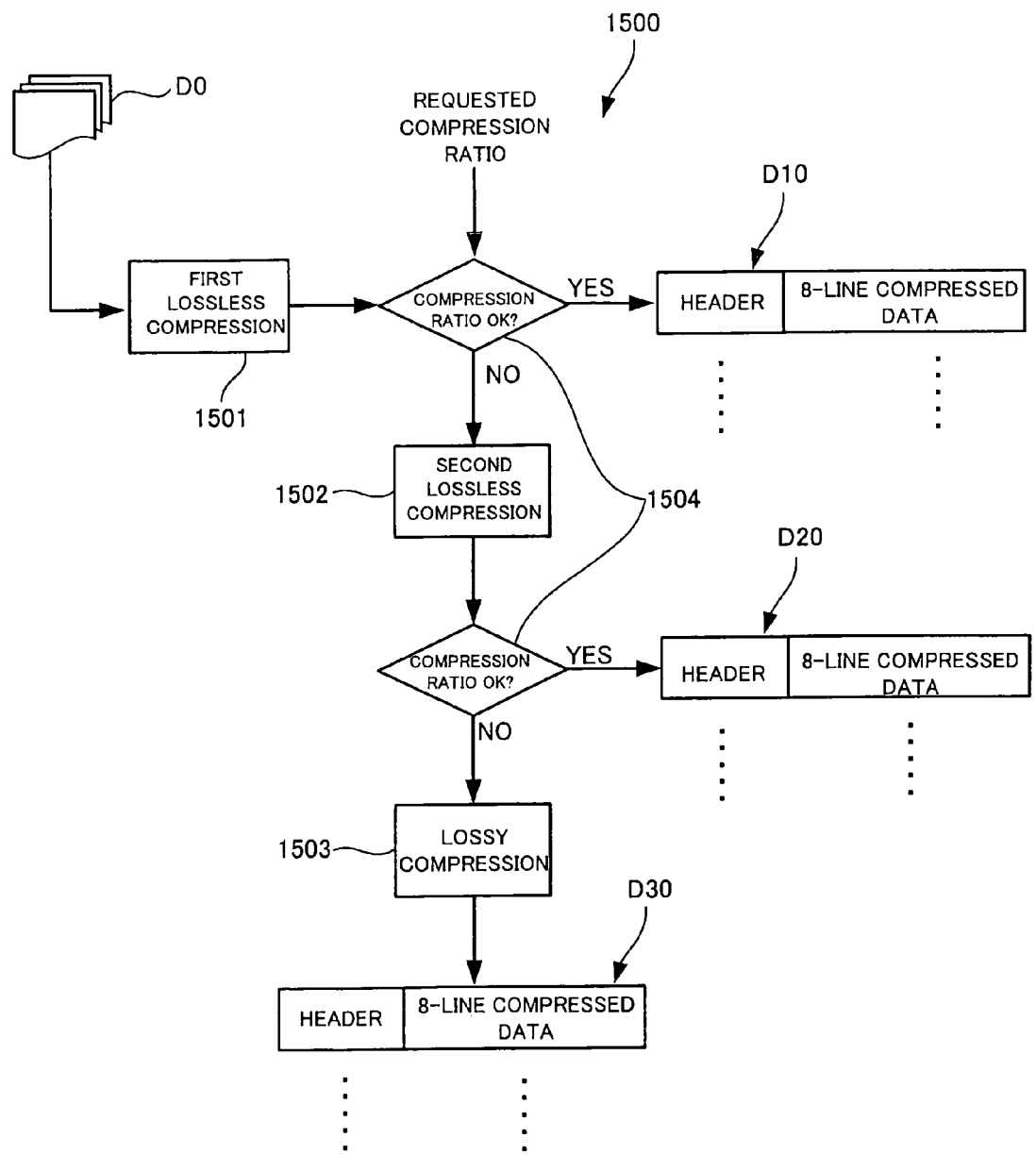
FIG. 22 is a block diagram showing an image compression apparatus corresponding to a third embodiment of the data compression apparatus of the present invention.

FIG. 22 is a block diagram showing an image compression apparatus corresponding to the third embodiment of the data compression apparatus of the present invention.

The image compression apparatus 1500 shown in FIG. 22 is provided with a first lossless compression processing section 1501, a second lossless compression processing section 1502, a lossy compression processing section 1503 and a determination section 1504. The details of each of the sections 1501 to 1503 will be described later. The flow of image data in this image compression apparatus 1500 is as shown below.

An input image file D0 (in this embodiment, a file in which the CT data 12A or the LW data 13A developed in a bitmap is stored as shown in FIG. 2) is inputted to the first lossless compression processing section 1501 of the image compression apparatus 1500 shown in FIG. 22. At this first lossless compression processing section 1501, first lossless compression processing is performed for image data in the input image file D0. In this embodiment, lossless compression processing preferable for compression of CT data is performed as the first lossless compression processing, and the compression processing is performed for eight lines of the input image as a unit. The first lossless compression processing section 1501 corresponds to an example of the first lossless compression processing section according to the present invention.

The data corresponding to eight lines for which the lossless compression processing has been performed at the first lossless compression processing section 1501 is inputted to the determination section 1504. The determination section 1504 has been notified of a requested compression ratio in advance, and it is determined at the determination section 1504 whether or not the inputted, compressed data is data compressed to a level satisfying the requested compression ratio. This determination is also performed for eight lines of the input image as a unit. If the compressed data corresponding to eight lines is data satisfying the requested compression ratio, then the compression ratio is satisfied at this lossless compression processing stage, and it is not necessary to perform compression any more. The data is immediately outputted as losslessly compressed data D10. When this losslessly compressed data D10 is outputted, a header is attached thereto in which the position of the losslessly compressed data D10 on the input image, information required for later expansion processing and the like are described.

If it is determined at the determination section 1504 that the compressed data is data which does not satisfy the requested compression ratio, then the determination result is notified to the second lossless compression processing section 1502. At the second lossless compression processing section 1502, second lossless compression processing is performed for the image data in the original input image file D0. In this embodiment, lossless compression processing preferable for compression of LW data is performed as the second lossless compression processing, and again, the compression processing is performed for eight lines of the input image as a unit.

The data corresponding to eight lines for which the lossless compression processing has been performed at the second lossless compression processing section 1502 is also inputted to the determination section 1504, and it is determined whether or not the data is data compressed to a level satisfying the requested compression ratio. If the compressed data corresponding to eight lines is data satisfying the requested compression ratio at this point of time, then the compression ratio is satisfied at this lossless compression processing stage, and it is not necessary to perform compression any more. The data is immediately outputted as losslessly compressed data D20. When the losslessly compressed data D20 is outputted, a header is also attached.

If it is determined at the determination section 1504 that the data for which the second lossless compression processing is performed is data which does not satisfy the requested compression ratio, then the determination result is notified to the lossy compression processing section 1503. At the lossy compression processing section 1503, lossy compression is performed for the image data in the original input image file D0. The compression processing is also performed for eight lines of the input image as a unit, and lossily compressed data D30 is out putted. A necessary header is also attached to this lossily compressed data D30.

The compressed data D10, D20 and D30 obtained at the image compression apparatus 1500 shown in FIG. 22 as described above are transferred to the interface device 200 via the general-purpose interface 150, such as an SCSI cable, shown in FIG. 1. At the interface device 200, data expansion processing is performed for the received, losslessly compressed data. In this data expansion processing, decoding processing corresponding to each of the various encoding processings described with reference to FIG. 3 is performed, and the same or almost the same image data in the original input image file is recovered.

Figure 23:
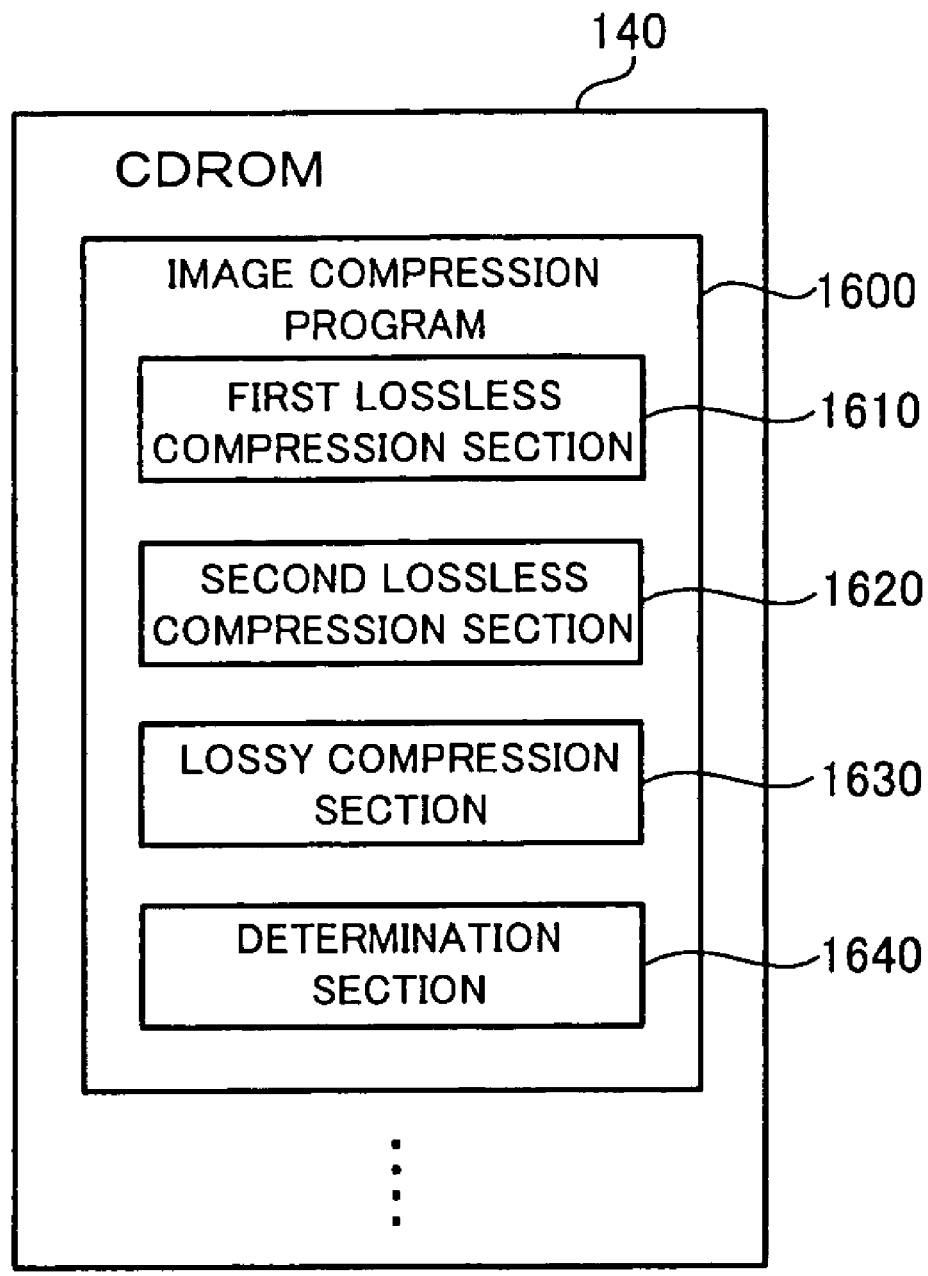
FIG. 23 is a schematic block diagram of an image compression processing program stored in a CD-ROM corresponding to a third embodiment of the data compression program storage medium of the present invention.

FIG. 23 is a schematic block diagram of an image compression processing program stored in a CD-ROM corresponding to a third embodiment of the data compression program storage medium of the present invention.

Here, an image compression program 1600 is stored in the CD-ROM 140.

This image compression program 1600 is configured by a first lossless compression processing section 1610, a second lossless compression processing section 1620, a lossy compression processing section 1630 and a determination section 1640. In the CD-ROM 140, there are also stored various programs for executing a series of processings in the host controller 100 shown in FIG. 1, in addition to the image compression program 1600 shown here. However, illustration and description thereof will be omitted because they are similar to conventional ones.

Here, the image compression program 1600 shown in FIG. 23 realizes the image compression apparatus 1500 shown in FIG. 22 in the host controller 100 by being installed in the host controller 100 and executed by the CPU 111. The first lossless compression processing section 1610, the second lossless compression processing section 1620, the lossy compression processing section 1630 and the determination section 1640 are program modules for causing the host controller 100 to operate as the first lossless compression processing section 1501, the second lossless compression processing section 1502, the lossy compression processing section 1503 and the determination section 1504 which constitute the image compression apparatus 1500 shown in FIG. 22, respectively, by being executed by the CPU 111. That is, the components of the image compression apparatus 1500 are substantially constructed on the host controller 100 by these program modules.

The operations of the sections 1610 to 1640 constituting the image compression program 1600 in FIG. 23 performed when they are executed by the CPU 111 are just the same operations of the sections 1501 to 1504 constituting the image compression apparatus 1500 in FIG. 22, respectively. Therefore, the description which has been made on each of the sections 1501 to 1504 of the image compression apparatus 1500 in FIG. 22 and detailed description below are also regarded as description about each of the sections 1610 to 1640 constituting the image compression program 1600 in FIG. 23.

First, the first lossless compression processing section 1501 will be described.

Figure 24:
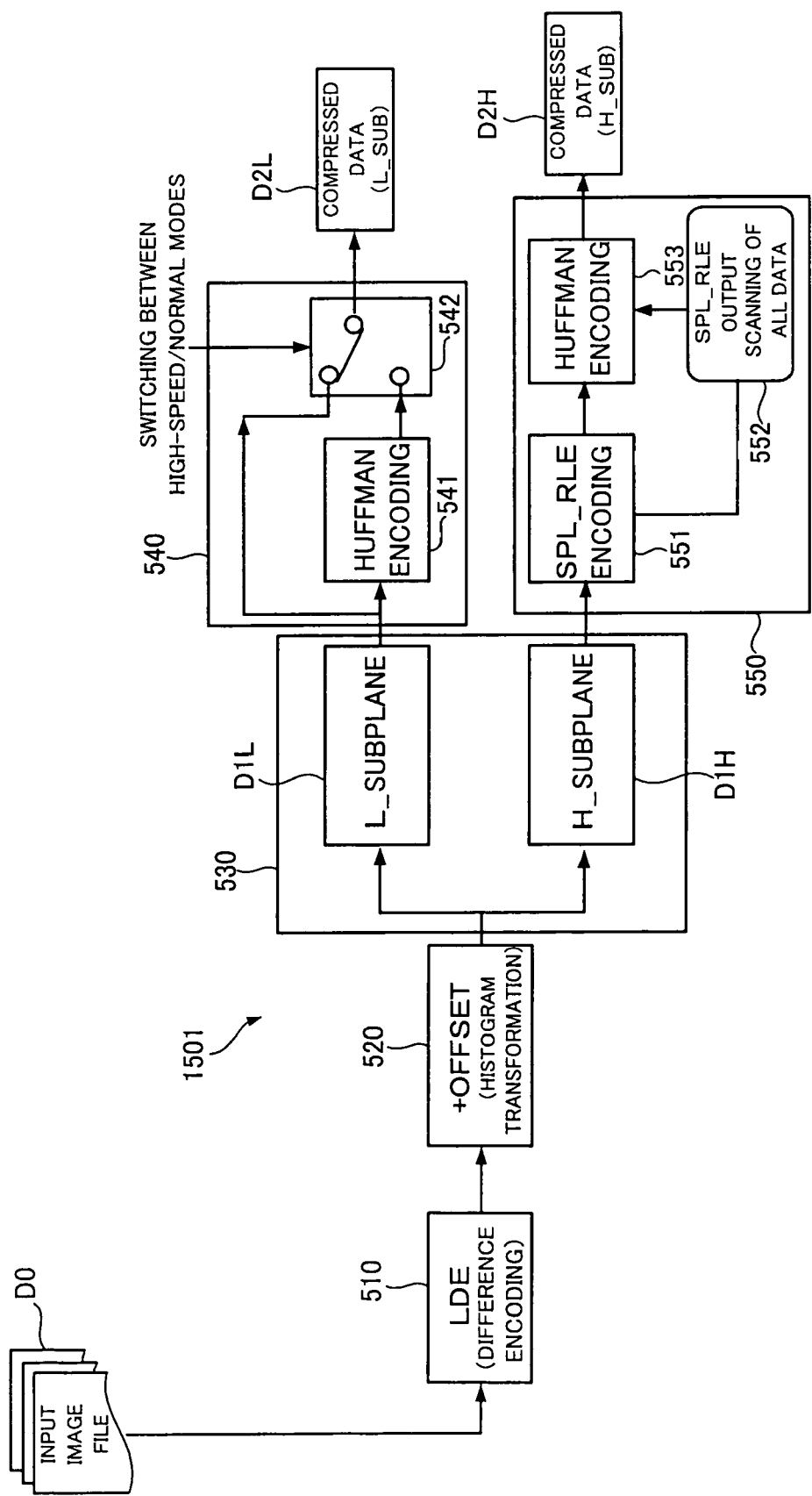
FIG. 24 is a block diagram showing a first lossless compression processing section.

FIG. 24 is a block diagram showing the first lossless compression processing section 1501.

This first lossless compression processing section 1501 is provided with a difference encoding section 510, an offset section 520, a plane division section 530, an L plane compression section 540 and an H plane compression section 550. The processing at each of the sections 510 to 550 is quite the same as the processing performed for true pixel data in the first embodiment. The first lossless compression processing section 1501 is capable of compressing image data by lossless compression, and significant compression is realized especially for CT image data. The processing at each section is such that is performed by a simple algorithm and, therefore, can be performed at a high speed.

Next, the second lossless compression processing section 1502 shown in FIG. 22 will be described.

Figure 25:
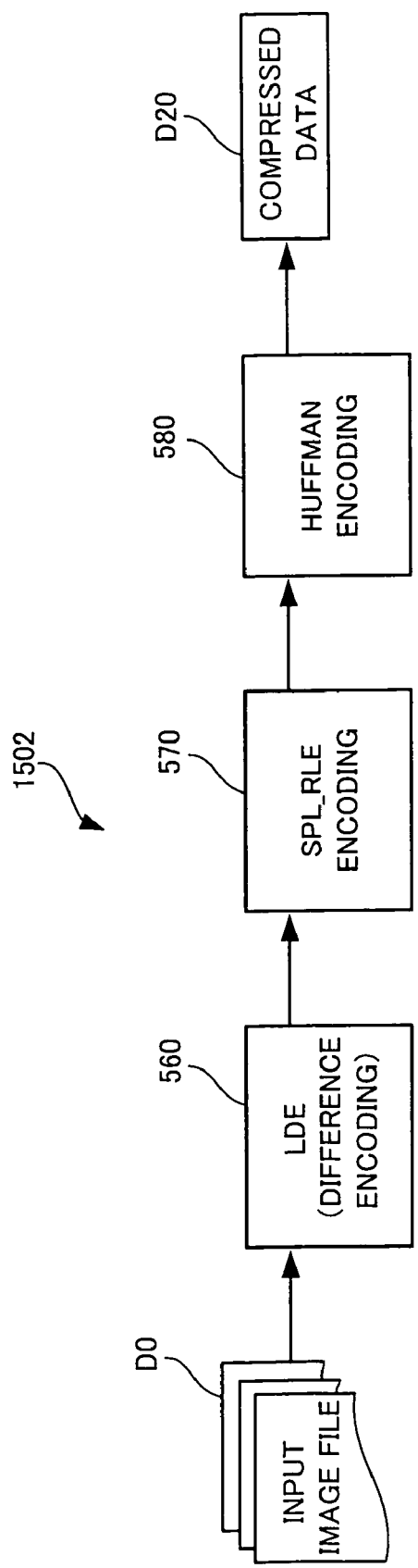
FIG. 25 is a block diagram showing a second lossless compression processing section.

FIG. 25 is a block diagram showing the second lossless compression processing section 1502.

This second lossless compression processing section 1502 is provided with a difference encoding section 560, a run-length encoding section 570 and a Huffman encoding section 580.

Image data inputted to the second lossless compression processing section 1502 is inputted to the difference encoding section 560. The difference encoding section 560 is quite the same as the difference encoding section 510 shown in FIG. 24, and difference encoding processing is also executed at the difference encoding section 560 of the second lossless compression processing section 1502. The data for which the difference encoding processing has been performed is inputted to the run-length encoding section 570. At the run-length encoding section 570, encoding processing similar to the encoding processing described with reference to FIGS. 11 to 13 is executed.

At the second lossless compression processing section 1502, run-length encoding processing is executed immediately after the difference encoding processing, unlike the first lossless compression processing section 1501. Such a procedure is suitable especially for processing of LW data. That is, in the case of an LW image, the data for which the difference encoding processing has been performed is such that is concentrated on some particular values, and realization of significant compression is expected by performing the run-length encoding processing as described above for such data.

The data for which the run-length encoding processing has been performed is inputted to the Huffman encoding section 580. At the Huffman encoding section 580, the data scanning and the Huffman encoding described with reference to FIGS. 14 and 15 are executed, and the data is further compressed.

As described above, by various processings being executed by the respective sections of the second lossless compression processing section 1502, the second lossless compression processing section 1502 can compress the image data by lossless compression, and significant compression is realized especially for data of an LW image. The various processings at the second lossless compression processing section 1502 are also performed by simple algorithms and, therefore, they can be performed at a high speed.

Finally, the lossy compression processing section 1503 shown in FIG. 22 will be described.

This lossy compression processing section 1503 has quite the same configuration as the image compression apparatus of the first embodiment shown in FIG. 3. It classifies image data as true pixel data and fake pixel data, performs lossless compression for the true pixel data and performs lossy compression for the fake pixel data.

A pair of the compressed low-order data D2L and the compressed high-order data D2H constituting losslessly compressed data which is the losslessly compressed true pixel data, and lossily compressed data D3 which is the lossily compressed fake pixel data, constitute the lossily compressed data D30 which is the lossily compressed image data in the input image file D0, as a whole.

That is, the lossy compression processing section 1503 compresses image data by lossy compression, and more significant compression is realized than compression by the first lossless compression processing section, especially for CT image data. The various processings at the lossy compression processing section 1503 are also performed by simple algorithms and, therefore, they can be performed at a high speed.

Thus, the image compression apparatus 1500 shown FIG. 22 can perform high-speed and significant compression for various types of data by being provided with the first lossless compression processing section 1501, the second lossless compression processing section 1502 and the lossy compression processing section 1503.

In the above description, the first lossless compression processing section 1501 which performs processing suitable for compression of CT data is shown as an example of the first lossless compression processing section according to the present invention, and the second lossless compression processing section 1502 which performs processing suitable for compression of LW data as an example of the second lossless compression processing section according to the present invention. However, it is also possible that the first lossless compression processing section according to the present invention and the second lossless compression processing section according to the present invention perform processing suitable for compression of LW data and processing suitable for compression of CT data, respectively.

What is claimed is:

1. A data compression apparatus which performs data compression processing for data to be compressed, the data being constituted by a sequence of numeric values indicated by a predetermined unit number of bits, the data compression apparatus comprising:

a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values;

a lossless compression section which performs lossless compression processing for the first data to be compressed which has been created by the thinning processing section; and a lossy compression section which performs lossy compression processing for the second data to be compressed which has been created by the thinning processing section; and wherein the lossy compression section determines, for the numeric values constituting the second data to be compressed which has been created by the thinning processing section, whether or not the numeric value is between the numeric values before and after the numeric value which have been thinned out by the thinning out of the thinning processing section, outputs a code indicating that the numeric value is between the numeric values before and after the numeric value which have been thinned out if the numeric value is between the numeric values before and after the numeric value which have been thinned out, and outputs a numeric value obtained by re-expressing the numeric value by a smaller number of bits than the unit number of bits if the numeric value is not between the numeric values before and after the numeric value which have been thinned out.

2. The data compression apparatus according to claim 1, wherein when re-expressing a numeric value by the smaller number of bits, the lossy compression section rounds down low-order bit of the value with the unit number of bits.

3. The data compression apparatus according to claim 1, wherein, when re-expressing a numeric value by the smaller number of bits, the lossy compression section re-expresses the numeric value by dividing the range of numeric values which is left after excluding the range of the numeric values thinned out from respective predetermined locations from the range of numeric values to be expressed by the unit number of bits, and allocating each of the divided ranges to a code indicated by the smaller number of bits.

4. The data compression apparatus according to claim 1, wherein the data to be compressed indicates a two-dimensional image;

the data compression apparatus comprises a determination section which determines an edge portion in the image; and for each of the numeric values constituting the second data to be compressed which has been created by the thinning processing section, the lossy compression section outputs a predetermined code with a smaller number of bits than the unit number of bits if the numeric value is not an edge portion determined by the determination section, and outputs a numeric value obtained by re-expressing the numeric value by a smaller number of bits than the unit number of bits if the numeric value is an edge portion.

5. The data compression apparatus according to claim 4, wherein, when re-expressing a numeric value by the smaller number of bits, the lossy compression section rounds down low-order digits of the value with the unit number of bits.

6. The data compression apparatus according to claim 4, wherein the determination section determines an edge portion in the image, based on difference between adjacent numeric values in the sequence of numeric values constituting the first data to be compressed which has been created by the thinning processing section.

7. The data compression apparatus according to claim 4, wherein the determination section determines an edge portion in the image, for each of the numeric values constituting the first data to be compressed, based on two-dimensional differences based on multiple numeric values which are adjacent to the numeric value in multiple directions when seen on the image.

8. The data compression apparatus according to claim 1, wherein the lossless compression section comprises:

a difference generation section which generates, by determining difference between adjacent numeric values in the sequence of numeric values constituting the first data to be compressed which has been created by the thinning processing section, new data to be compressed which is configured by a sequence of numeric values indicating the differences;

an offset section which offsets each of the numeric values constituting the new data to be compressed which has been generated by the difference generation section, by a predetermined value;

a division section which, by separating each of the numeric values of the data to be compressed which have been offset by the offset section into a high-order bit portion and a low-order bit portion with a predetermined dividing number of bits smaller than the unit number of bits, divides the data to be compressed into high-order data configured by a sequence of the high-order bit portions of the respective numeric values and low-order data configured by a sequence of the low-order bit portions of the respective numeric values;

a high-order data compression section which performs lossless compression processing for the high-order data divided by the division section; and a low-order data compression section which performs lossless compression processing for the low-order data divided by the division section.

9. The data compression apparatus according to claim 8, wherein the high-order data compression section comprises a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed.

10. The data compression apparatus according to claim 8, wherein high-order data compression section comprises:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed; and a second encoding section which performs entropy encoding for the data encoded by the first encoding section, with the use of a table in which a code and a numeric value are associated with each other.

11. The data compression apparatus according to claim 8, wherein the high-order data compression section comprises:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed; and a second encoding section which performs Huffman encoding for the data encoded by the first encoding section, with the use of a Huffman table.

12. The data compression apparatus according to claim 8, wherein the high-order data compression section comprises:

a first encoding section which outputs the numeric values other than one or multiple predetermined numeric values to be compressed in the high-order data as they are, and outputs each of the numeric values to be compressed after encoding the numeric value to be compressed into the numeric value to be compressed and a numeric value indicating the number of continuations of the same numeric value to be compressed;

a histogram calculation section which determines a histogram of numeric values appearing in the data encoded by the first data compression section;

a code assignment section which assigns a shorter code to a numeric value with a higher appearance frequency in a table in which a code and a numeric value are associated with each other, based on the histogram determined by the histogram calculation section; and a second encoding section which performs entropy encoding for the data encoded by the first encoding section, with the use of a table in which codes are assigned by the code assignment section.

13. The data compression apparatus according to claim 8, wherein the low-order data compression section performs entropy encoding for the low-order data with the use of a table in which a code and a numeric value is associated.

14. The data compression apparatus according to claim 8, wherein the low-order data compression section performs Huffman encoding for the low-order data with the use of a Huffman table.

15. The data compression apparatus according to claim 8, wherein the low-order data compression section outputs the low-order data without compressing the low-order data in response to an instruction to omit compression.

16. A data compression apparatus which performs data compression processing for data to be compressed, the data being constituted by a sequence of numeric values indicated by a predetermined unit number of bits, the data compression apparatus comprising:

a first lossless compression processing section which performs first lossless compression processing for the data to be compressed;

a second lossless compression processing section which performs second lossless compression processing for the data to be compressed if the result of the data compression by the first lossless compression processing section does not reach a predetermined target compression ratio; and a lossy compression processing section which performs lossy compression processing for the data to be compressed if the result of the data compression by the second lossless compression processing section does not reach the target compression ratio; wherein one of the first lossless compression processing section and the second lossless compression processing section comprises:

a difference generation section which generates, by determining difference between adjacent numeric values in the sequence of numeric values constituting the data to be compressed, new data to be compressed which is configured by a sequence of numeric values indicating the differences;

an offset section which offsets each of the numeric values constituting the new data to be compressed which has been generated by the difference generation section, by a predetermined value;

a division section which, by separating each of the numeric values of the data to be compressed which have been offset by the offset section into a high-order bit portion and a low-order bit portion with a predetermined dividing number of bits smaller than the unit number of bits, divides the data to be compressed into high-order data configured by a sequence of the high-order bit portions of the respective numeric values and low-order data configured by a sequence of the low-order bit portions of the respective numeric values;

a high-order data compression section which performs lossless compression processing for the high-order data divided by the division section; and a low-order data compression section which performs lossless compression processing for the low-order data divided by the division section;

the other of the first lossless compression processing section and the second lossless compression processing section performs lossless compression processing including encoding processing for outputting the numeric values other than one or multiple predetermined numeric values to be compressed in the original data to be compressed, as they are, and outputs each of the numeric values to be compressed after encoding the numeric value to be compressed into the numeric value to be compressed and a numeric value indicating the number of continuations of the same numeric value to be compressed; and the lossy compression processing section comprises:

a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values;

a lossless compression section which performs lossless compression processing for the first data to be compressed which has been created by the thinning processing section; and a lossy compression section which performs lossy compression processing for the second data to be compressed which has been created by the thinning processing section; and wherein the lossy compression section determines, for the numeric values constituting the second data to be compressed which has been created by the thinning processing section, whether or not the numeric value is between the numeric values before and after the numeric value which have been thinned out by the thinning out of the thinning processing section, outputs a code indicating that the numeric value is between the numeric values before and after the numeric value which have been thinned out if the numeric value is between the numeric values before and after the numeric value which have been thinned out, and outputs a numeric value obtained by re-expressing the numeric value by a smaller number of bits than the unit number of bits if the numeric value is not between the numeric values before and after the numeric value which have been thinned out.

17. A non-transitory data compression program storage medium which stores a data compression program which is incorporated in an information processing apparatus for executing a program and causes the information processing apparatus to perform data compression processing for data to be compressed, the data being constituted by a sequence of numeric values indicated by a predetermined unit number of bits, and the data compression program constructing, on the information processing apparatus:
  a thinning processing section which creates, by cyclically thinning out a numeric value from the sequence of numeric values constituting the data to be compressed, first data to be compressed which is constituted by a sequence of the numeric values taken out from the data to be compressed by the thinning out, and second data to be compressed which is constituted by a sequence of the remaining numeric values;
  a lossless compression section which performs lossless compression processing for the first data to be compressed which has been created by the thinning processing section; and
  a lossy compression section which performs lossy compression processing for the second data to be compressed which has been created by the thinning processing section; and wherein the lossy compression section determines, for the numeric values constituting the second data to be compressed which has been created by the thinning processing section, whether or not the numeric value is between the numeric values before and after the numeric value which have been thinned out by the thinning out of the thinning processing section, outputs a code indicating that the numeric value is between the numeric values before and after the numeric value which have been thinned out if the numeric value is between the numeric values before and after the numeric value which have been thinned out, and outputs a numeric value obtained by re-expressing the numeric value by a smaller number of bits than the unit number of bits if the numeric value is not between the numeric values before and after the numeric value which have been thinned out.

* * * * *